(12) United States Patent
Sekiguchi

(10) Patent No.: US 10,046,805 B2
(45) Date of Patent: Aug. 14, 2018

(54) VEHICLE BODY SIDE FRAME

(71) Applicant: HONDA MOTOR CO., LTD., Tokyo (JP)

(72) Inventor: Tomohide Sekiguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/178,683

(22) Filed: Jun. 10, 2016

(65) Prior Publication Data
US 2016/0362139 A1 Dec. 15, 2016

(30) Foreign Application Priority Data

Jun. 15, 2015 (JP) ................................ 2015-120015

(51) Int. Cl.
*B62D 21/15* (2006.01)
*B62D 21/02* (2006.01)
*B62D 25/08* (2006.01)
*B62D 29/00* (2006.01)

(52) U.S. Cl.
CPC ......... *B62D 21/152* (2013.01); *B62D 25/082* (2013.01); *B62D 29/007* (2013.01)

(58) Field of Classification Search
CPC ... B62D 21/152; B62D 29/007; B62D 25/082
USPC .................................................. 296/187.09
See application file for complete search history.

(56) References Cited

U.S. PATENT DOCUMENTS 8,454,079 B2 * 6/2013 Yoshida ................... B21D 7/08
296/187.09

8,689,955 B2 * 4/2014 Mori ......................... F16F 7/12
188/377

FOREIGN PATENT DOCUMENTS

| EP | 2143621 A1 | 1/2010 |
|----|------------|--------|
| EP | 2479452 A1 | 7/2012 |
| JP | 2003-328031 A | 11/2003 |
| JP | 2012-144253 A | 8/2012 |
| JP | 2012-528752 A | 11/2012 |
| WO | 2015/001114 A1 | 1/2015 |

OTHER PUBLICATIONS

Chinese Office Action dated Dec. 21, 2017, issued in counterpart Chinese Patent Application No. 201610312335.6.

* cited by examiner

Primary Examiner — Joseph D. Pape
Assistant Examiner — Dana D Ivey
(74) Attorney, Agent, or Firm — Westerman, Hattori, Daniels & Adrian, LLP

(57) ABSTRACT

A vehicle body side frame is a member that absorbs applied impact load by bending under the impact load. The vehicle body side frame includes plural ultrahigh strength portions provided at intervals along a longitudinal direction, and plural high strength portions interposed between the plural ultrahigh strength portions. A tensile strength of the ultrahigh strength portions exceeds 1400 MPa, and a tensile strength of the high strength portions is from 500 MPa to 1000 MPa. The high strength portions are formed with a sheet thickness greater than that of the ultrahigh strength portions. A front stress concentrating portion, a central stress concentrating portion, and a rear stress concentrating portion are respectively formed to a front high strength portion, a central high strength portion, and a rear high strength portion.

5 Claims, 25 Drawing Sheets

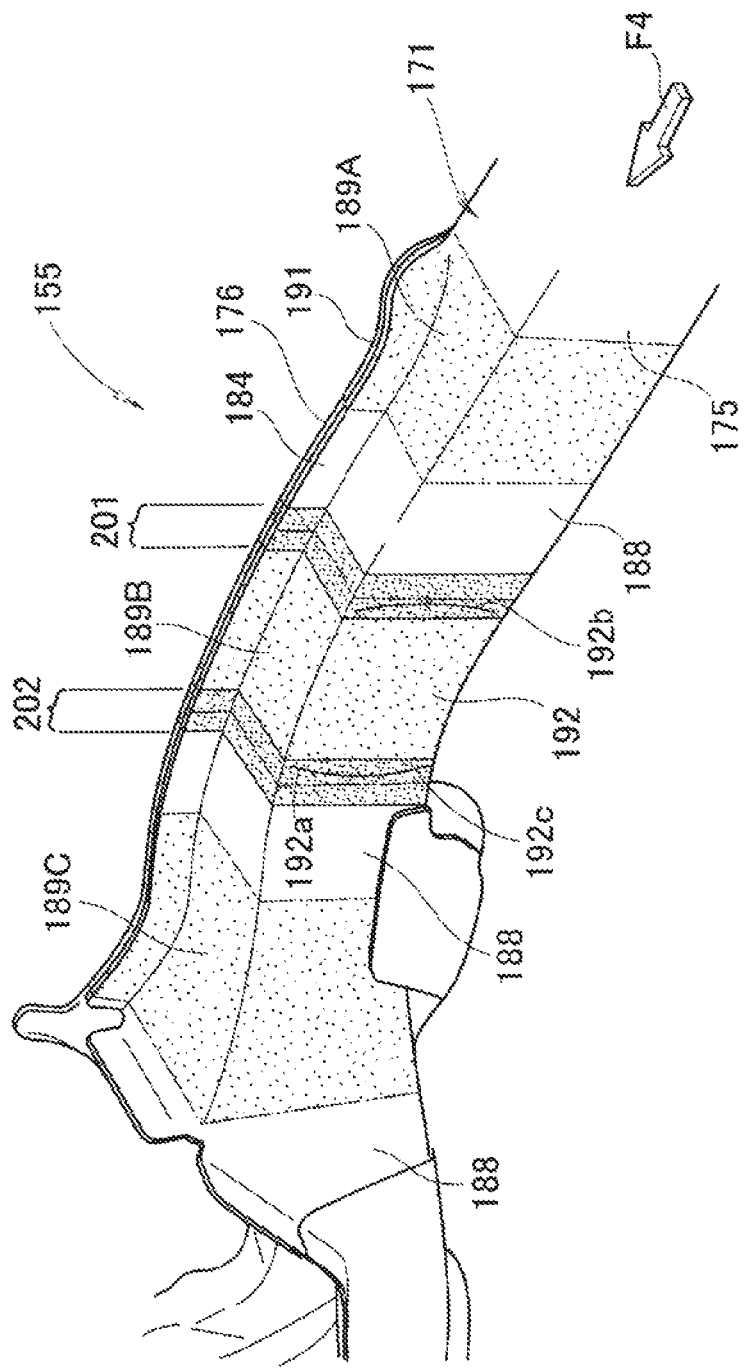

VEHICLE BODY SIDE FRAME

CROSS REFERENCES TO RELATED APPLICATIONS

The present application claims priority under 35 U.S.C. § 119 to Japanese Patent Application No. 2015-120015, filed Jun. 15, 2015, entitled "Vehicle Body Side Frame." The contents of this application are incorporated herein by reference in their entirety.

TECHNICAL FIELD

The present disclosure relates to a vehicle body side frame provided in an extended state along a front-rear direction of a vehicle body, and capable of absorbing impact load applied from the vehicle body front-rear direction.

BACKGROUND

Among vehicle body side frames, frames are known that are formed by hot stamping so as to have a tensile strength exceeding 1400 MPa, with end portions of the side frames (hereinafter referred to as frame end portions) formed as soft portions. The tensile strength of the soft portions is suppressed to less than 1000 MPa.

The sheet thickness of the side frames is suppressed by raising the tensile strength of the side frames that exceeds 1400 MPa, and a reduction in weight of the side frames is achieved.

The frame end portions are formed as soft portions by reducing the tensile strength of the frame end portions to less than 1000 MPa. Thus when impact load has been applied to the frame end portions, along the longitudinal direction (axial direction) of the side frames, the impact load is absorbed by the frame end portions crushing in the longitudinal direction under the impact load (see, for example, Japanese Unexamined Patent Application Publication (Translation of PCT Application) No. 2012-528752).

However, in the vehicle body side frame of Japanese Unexamined Patent Application Publication (Translation of PCT Application) No. 2012-528752, it is difficult to secure a large amount of crushing of the frame end portions due to the frame end portions being crushed along the longitudinal direction to absorb impact load. Thus the amount of absorption of the impact load by the frame end portions is reduced, and there accordingly remains room for improvement from this perspective.

Among vehicle body side frames, frames are also known that are formed by hot stamping with a tensile strength higher than 1400 MPa, with weak points formed so as to be different to each other on two side portions. The tensile strength of the weak points is reduced to a lower tensile strength of from 500 to 1000 MPa.

The sheet thickness of the side frames is reduced by raising the tensile strength of the side frames that exceeds 1400 MPa, and a reduction in weight of the side frames is achieved.

The tensile strength of the weak points is suppressed to a lower tensile strength in the range of from 500 to 1000 MPa. This thereby enables the mutually different weak points to be deformed when impact load has been applied to the side frames along the longitudinal direction, enabling the side frames to bend at the weak points. A deformation stroke of the side frames is secured by the side frames bending at the weak points, enabling the impact load to be absorbed (see, for example, International Publication No. 2015/001114).

In the side frames of International Publication No. 2015/001114, due to the bending at the weak points, portions facing the weak points are greatly stretched (hereinafter referred to as stretched portions). However, the stretched portions are formed with a tensile strength higher than 1400 MPa.

Thus, in a state in which the stretched portions have been greatly stretched, it is accordingly conceivable that cracks develop in the stretched portions, making it difficult to achieve favorable bending of the stretched portions. It is accordingly difficult for the stretched portions to bend and to secure an absorption amount of the impact load, leaving room for improvement from this perspective.

SUMMARY

The present application describes, for example, a vehicle body side frame that achieves a weight reduction and is also capable of securing an appropriate amount of impact load absorption.

The present disclosure provides a vehicle body side frame that is formed in a hollow shape extending along a vehicle body front-rear direction and that absorbs applied impact load by bending under the applied impact load. The vehicle body side frame includes plural ultrahigh strength portions provided at intervals along a longitudinal direction of the vehicle body side frame, the plural ultrahigh strength portions being formed in hollow shapes and having a tensile strength exceeding 1400 MPa, and plural high strength portions interposed between the plural ultrahigh strength portions so as to be connected to the plural ultrahigh strength portions, the high strength portions being formed in hollow shapes, and having a tensile strength from 500 to 1000 MPa. The high strength portions have a sheet thickness greater than that of the ultrahigh strength portions, and are provided with stress concentrating portions on a side portion thereof in a direction the vehicle body side frame will bend toward.

Accordingly, the plural ultrahigh strength portions are provided at intervals along the longitudinal direction of the side frame, and the plural ultrahigh strength portions are connected by the high strength portions. The high strength portions have a sheet thickness greater than that of the ultrahigh strength portions, and the stress concentrating portion is formed on the side portion of the high strength portion.

Thus, when impact load has been applied along the longitudinal direction (axial direction) to an end portion of the side frame, stress concentrates at the stress concentrating portion, and the stress concentrating portion acts as a bending initiation point (trigger) for the side frame. By making the sheet thickness of the high strength portions greater than that of the ultrahigh strength portions, an amount of stretching of side portions on the opposite side to the stress concentrating portion can be secured, and cracking can be suppressed from occurring in the side portion on the opposite side to the stress concentrating portion.

This enables high strength portions (namely, the side frame) to be favorably bent with the central stress concentrating portion acting as the initiation point, and enables an appropriate absorption amount of the impact load applied to the side frame to be secured.

The plural ultrahigh strength portions are provided to the side frame, and the tensile strength of the ultrahigh strength portions is set so as to exceed 1400 MPa. This enables the sheet thickness of the plural ultrahigh strength portions to be reduced, and a reduction in weight of the side frame to thereby be achieved.

Preferably, the vehicle body side frame is formed from at least two members including a first frame and a second frame divided along the longitudinal direction of the vehicle body side frame, and the first frame and the second frame are formed by employing a tailored rolled blank with a sheet thickness obtained by rolling.

The side frame is formed in this manner from at least two members, including the first frame and the second frame. The first frame and the second frame are formed by employing a tailored rolled blank. The sheet thicknesses of the first frame and the second frame can each be made to change smoothly to different sheet thicknesses at a desired location by rolling when in the tailored rolled blank state (namely, while as a single elongated strip shaped steel sheet).

The quality of the side frame can accordingly be secured by making the sheet thicknesses of the first frame and the second frame each change smoothly to different sheet thicknesses by rolling.

Preferably, the vehicle body side frame is formed from at least two members including a first frame and a second frame divided along the longitudinal direction of the vehicle body side frame, and the first frame and the second frame are formed by employing a tailored blank of joined members of different sheet thicknesses.

The side frame is formed in this manner from at least two members, including the first frame and the second frame. The first frame is formed by employing a tailored blank of joined members of different sheet thicknesses. The sheet thicknesses of the first frame can accordingly be made to differ at a desired location. Similarly, the second frame is formed by employing a tailored blank of joined members of different sheet thicknesses. Thus the sheet thicknesses of the second frame can also be made to differ at a desired location.

Making the sheet thicknesses of the first frame and the second frame differ at a desired location enables the sheet thickness of the side frame to be made to differ at a desired location. This enables weight reduction to be achieved in the side frame, and enables an appropriate absorption amount of the impact load applied to the side frame to be secured.

Preferably, the vehicle body side frame is formed by three-dimensionally hot bending a frame formed into a hollow shape.

The side frame can be formed by moving support rollers for three-dimensionally hot bending in the up-down direction and in the left-right direction, or changing the angle of the support rollers in the up-down direction and in the left-right direction. This thereby enables the need for a mold to form the side frame to be eliminated.

Forming the side frame using the support rollers for three-dimensionally hot bending moreover enables the length of the side frame, and the shape of the side frame, to be changed as desired. This thereby enables multiple types of side frame to be accommodated, and achieves an increase in the range of side frame applications.

Preferably, the vehicle body side frame is a front side frame provided at a side of a vehicle body front section at a vehicle width direction inside of a front wheel, and formed with an indented shaped escape portion on an outside wall to avoid impinging of the front wheel, and the escape portion is the stress concentrating portion.

Thus, the side frame is a front side frame, and the escape portion of the outside wall of the front side frame is utilized as the stress concentrating portion. The escape portion is a location to avoid the front wheel impinging on the front side frame. Utilizing the escape portion as the stress concentrating portion eliminates the need to form a new stress concentrating portion in the front side frame.

Forming the escape portion to the outside wall of the front side frame enables the front side frame to be shifted toward the front wheel side (namely, toward the vehicle width direction outside). An engine room is formed at the vehicle width direction inside of the front side frame. Thus, by shifting the front side frame toward the front wheel side, the engine room can be expanded in the vehicle width direction.

Preferably, the vehicle body side frame includes the stress concentrating portions in at least three locations.

This enables the stress concentrating portions to be provided across the entire area of the side frame.

Thus, locations of bending, when impact load has been applied along the longitudinal direction (axial direction) to an end portion of the side frame, can be increased to span across the entire area of the side frame, due to the respective stress concentrating portions acting as bending initiation points. This enables the impact load to be absorbed across the entire area of the side frame, and enables an appropriate absorption amount of the impact load to be secured.

Preferably, the vehicle body side frame includes the stress concentrating portion formed in an indented shape, and includes strength transition portions that contain respective vehicle body front-rear direction outlines of the stress concentrating portion, and that have a tensile strength transitioning from a tensile strength of the ultrahigh strength portion to a tensile strength of the high strength portion.

Accordingly, the stress concentrating portion of the side frame is formed in an indented shape. Moreover, the strength transition portions that contain outlines of the stress concentrating portion have a tensile strength transitioning from the tensile strength of the ultrahigh strength portion to the tensile strength of the high strength portion. This thereby enables a rapid change from the tensile strength of the ultrahigh strength portion to the tensile strength of the high strength portion to be suppressed from occurring at the outlines of the stress concentrating portion, and enables the degree of stress concentration at the outlines to be alleviated.

This thereby enables the degree of stress concentration at the stress concentrating portion to be raised, enabling smooth bending of the high strength portion, and enabling an appropriate absorption amount to be secured of the impact load applied to the side frame.

Preferably, the vehicle body side frame has the ultrahigh strength portions having a sheet thickness of 0.9 mm to 1.2 mm, and the high strength portions having a sheet thickness of 1.4 mm to 2.0 mm.

A reduction in weight of the side frame can thus be achieved by suppressing the sheet thickness of the ultrahigh strength portions to a range from 0.9 mm to 1.2 mm.

Since the sheet thickness of the high strength portions is as large as 1.4 mm to 2.0 mm, when the high strength portions are bent, an amount of stretching can be secured. This prevents a crack from occurring in the high strength portion, and secures an appropriate absorption of the impact load given to the side frame.

Thus, suppressing the sheet thickness of the ultrahigh strength portions and securing a large sheet thickness of the high strength portions can simultaneously achieve a reduction in the weight of the side frame and keep an impact load absorption capability.

The present application enables, for example, a reduction in weight of the side frame to be achieved, and an appropriate absorption amount of impact load applied to the side frame, to be secured.

BRIEF DESCRIPTION OF THE DRAWINGS

The advantages of the disclosure will become apparent in the following description taken in conjunction with the following drawings.

FIG. 23 is an enlargement of area XXIII in FIG. 19.

FIG. 24A is a plan view of a vehicle body front structure, FIG. 24B is a plan view of a front side frame on the left side, and FIG. 24C is a bottom view of a front side frame on the left side.

FIG. 25A is plan view of a front side frame on the left side, FIG. 25B is a bottom view of a front side frame on the left side, and FIG. 25C is a plan view of a vehicle body front section.

DETAILED DESCRIPTION

Explanation follows regarding a best embodiment for implementing the present application, with reference to the appended drawings. References to "front (Fr)", "rear (Rr)", "left (L)", and "right (R)" conform to directions observed from the perspective of a driver.

Example 1

Explanation follows regarding a vehicle body side frame 10 according to Example 1.

Figure 1:
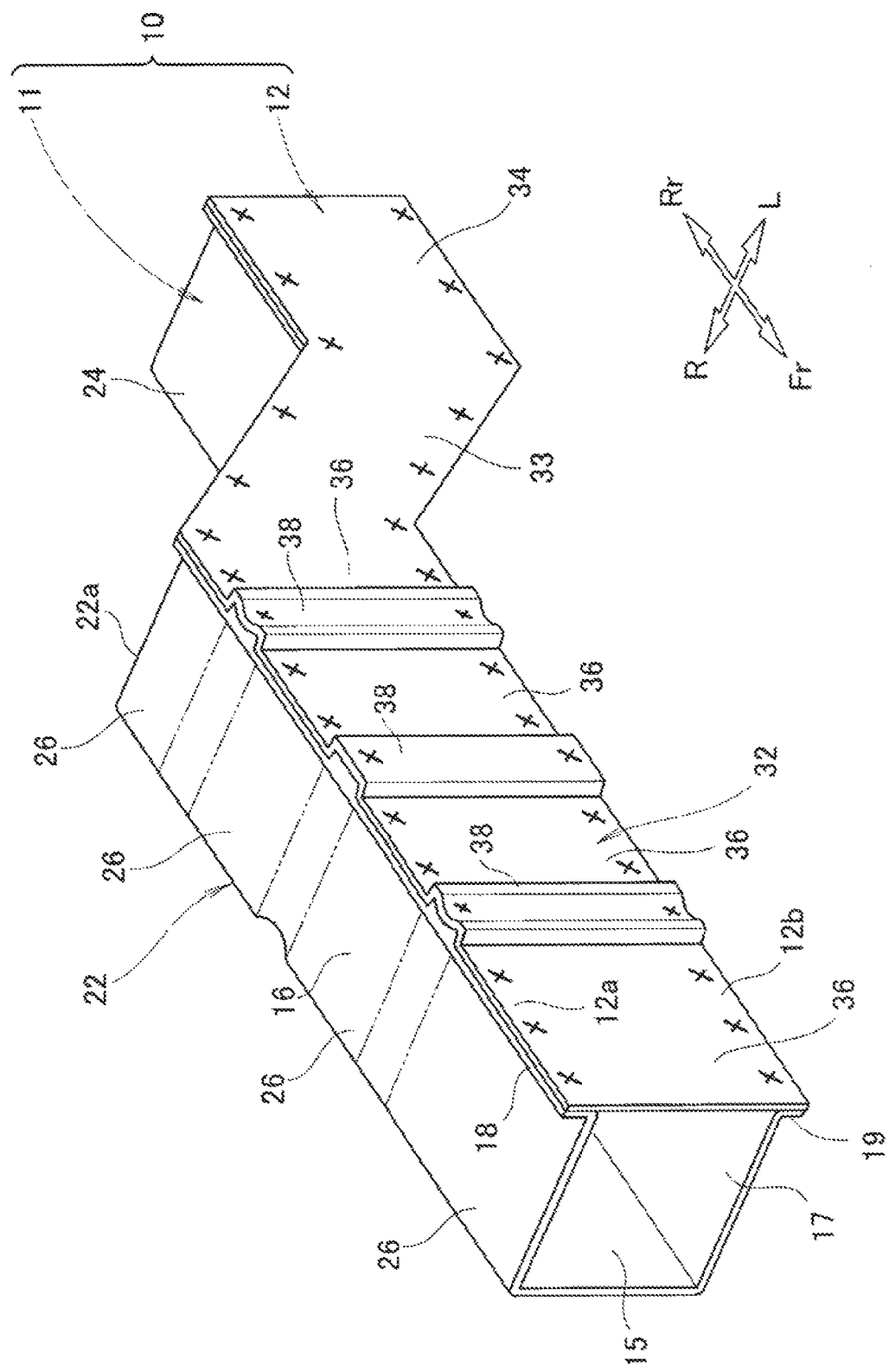
FIG. 1 is a perspective view illustrating a vehicle body side frame of Example 1 according to the present application.
Figure 2:
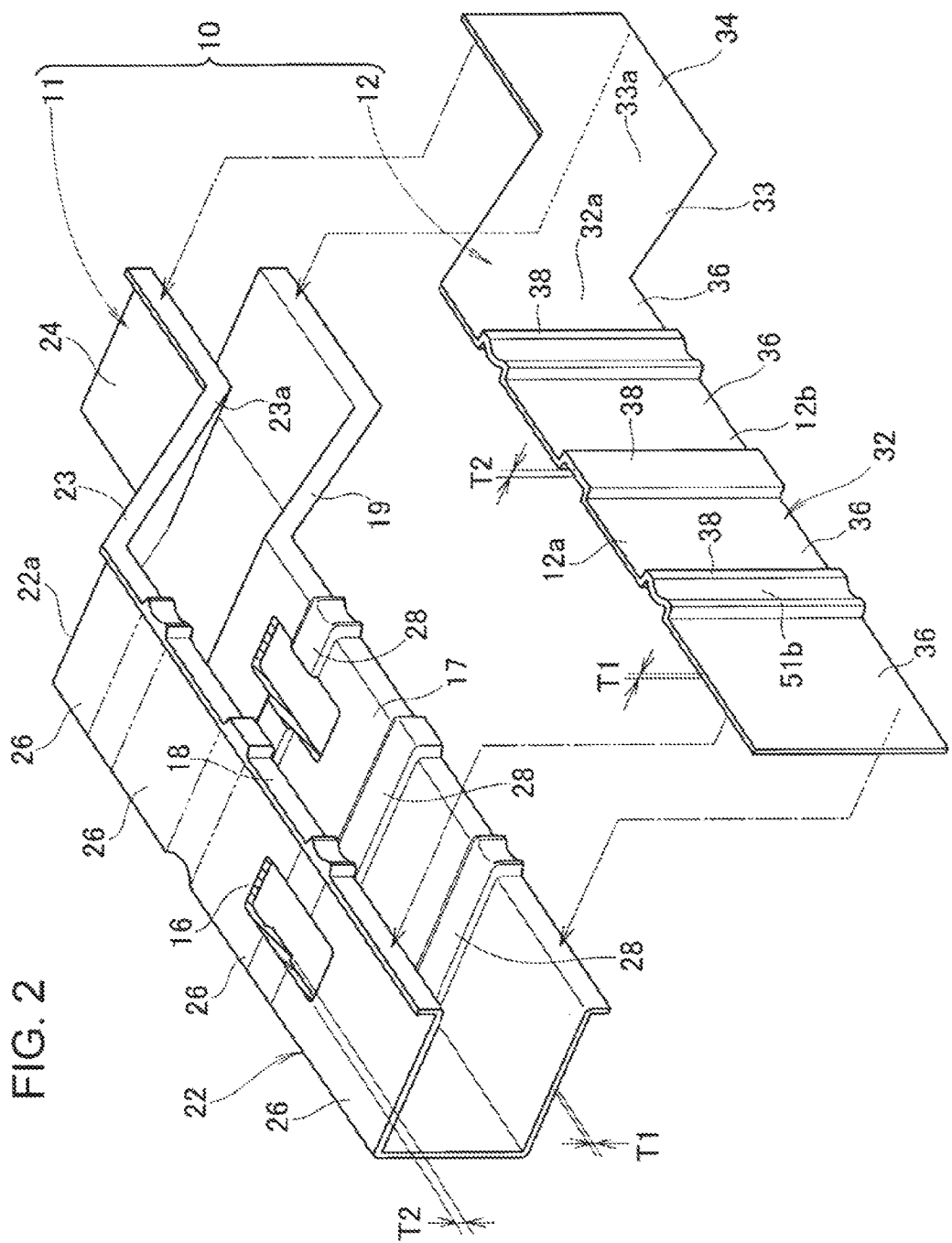
FIG. 2 is an exploded perspective view illustrating the side frame of FIG. 1.

As illustrated in FIG. 1 and FIG. 2, the vehicle body side frame 10 includes two members, these being a first frame 11 and a second frame 12, divided along the longitudinal direction (axial direction) of the vehicle body side frame 10.

In the following the vehicle body side frame 10 is abbreviated to "side frame 10".

The side frame 10 is a framework member of a vehicle body and is respectively provided at left and right sides in the vehicle width direction. Explanation follows regarding an example of the side frame on the left side in Example 1.

The first frame 11 includes a vertically disposed side wall 15, a top section 16 that bends around to the horizontal from the upper edge of the side wall 15, a bottom section 17 that bends around to the horizontal from the lower edge of the side wall 15, an upper flange 18 that juts out upward from an edge of the top section 16, and a lower flange 19 that juts out downward from an edge of the bottom section 17.

The side wall 15, the top section 16, and the bottom section 17 of the first frame 11 form a substantially U-shaped cross-section. The first frame 11 is formed with a substantially hat shaped cross-section by the side wall 15, the top section 16, the bottom section 17, the upper flange 18, and the lower flange 19.

The first frame 11 includes a first impact absorbing section 22 extending in the vehicle body front-rear direction, a first sloping section 23 extending from a rear end 22a of the first impact absorbing section 22 at a downward gradient toward the vehicle body rear, and a first horizontal section 24 extending from a rear end 23a of the first sloping section 23 toward the vehicle body rear.

The first impact absorbing section 22 includes plural first ultrahigh strength portions 26 provided at intervals along the longitudinal direction of the side frame 10, and plural first high strength portions 28 interposed between the plural first ultrahigh strength portions 26 so as to connect to the plural first ultrahigh strength portions 26 at both ends.

The plural first ultrahigh strength portions 26 and the plural first high strength portions 28 are connected together in an integrated state alternately disposed along the vehicle body front-rear direction.

The first ultrahigh strength portions 26 are locations where the tensile strength exceeds 1400 MPa, and are each formed with a sheet thickness T1.

The first high strength portions 28 are locations where the tensile strength is suppressed to from 500 to 1000 MPa, and are each formed with a sheet thickness T2 greater than the sheet thickness T1 of the first ultrahigh strength portions 26.

The first sloping section 23 is connected so as to extend from the rear end (namely the rear end 22a of the first impact absorbing section 22) of the first ultrahigh strength portion 26 on the vehicle body rear side of the plural first ultrahigh strength portions 26 with a downward gradient toward the vehicle body rear.

The first horizontal section 24 is connected so as to extend toward the vehicle body rear from the rear end 23a of the first sloping section 23. The first frame 11 is integrally formed by the first impact absorbing section 22, the first sloping section 23, and the first horizontal section 24 being connected together.

The second frame 12 includes a second impact absorbing section 32 formed in a vertically disposed plate shape and extending along the vehicle body front-rear direction, a second sloping section 33 extending from a rear end 32*a* of the second impact absorbing section 32 at a downward gradient toward the vehicle body rear, and a second horizontal section 34 extending from a rear end 33*a* of the second sloping section 33 toward the vehicle body rear.

The second impact absorbing section 32 includes plural second ultrahigh strength portions 36 provided at intervals along the longitudinal direction of the side frame 10, and plural second high strength portions 38 interposed between plural ultrahigh strength portions so as to be connected to the plural second ultrahigh strength portions 36 at both ends.

The plural second ultrahigh strength portions 36 and the plural second high strength portions 38 are connected together in an integrated state alternately disposed along the vehicle body front-rear direction.

The second ultrahigh strength portions 36 are, similarly to the first ultrahigh strength portions 26, locations where the tensile strength exceeds 1400 MPa, and are each formed with the sheet thickness T1.

The second high strength portions 38 are, similarly to the first high strength portions 28, locations where the tensile strength is suppressed to from 500 to 1000 MPa, and are each formed with the sheet thickness T2 greater than the sheet thickness T1 of the second ultrahigh strength portions 36.

The second sloping section 33, similarly to the first sloping section 23, is connected so as to extend from the rear end (namely, the rear end 32*a* of the second impact absorbing section 32) of the second ultrahigh strength portion 36 on the vehicle body rear side of the plural second ultrahigh strength portions 36 at a downward gradient toward the vehicle body rear.

The second horizontal section 34, similarly to the first horizontal section 24, is connected so as to extend from the rear end 33*a* of the second sloping section 33 toward the vehicle body rear.

The second frame 12 is integrally formed by the second impact absorbing section 32, the second sloping section 33, and the second horizontal section 34 being connected together.

The upper flange 18 of the first frame 11 and an upper edge 12*a* of the second frame 12 are welded together. The lower flange 19 of the first frame 11 and a lower edge 12*b* of the second frame 12 are also welded together. The side frame 10 is accordingly formed by the first frame 11 and the second frame 12.

The side frame 10 extends in the vehicle body front-rear direction, and is formed with a rectangular closed cross-section hollow shape from the first frame 11 (specifically from the side wall 15, the top section 16, and the bottom section 17) and the second frame 12.

In the following explanation, sometimes the side wall 15 of the first frame 11 will be referred to as the "inside wall 15" of the side frame 10 and the second frame 12 referred to as the "outside wall 12" of the side frame 10.

Figure 3:
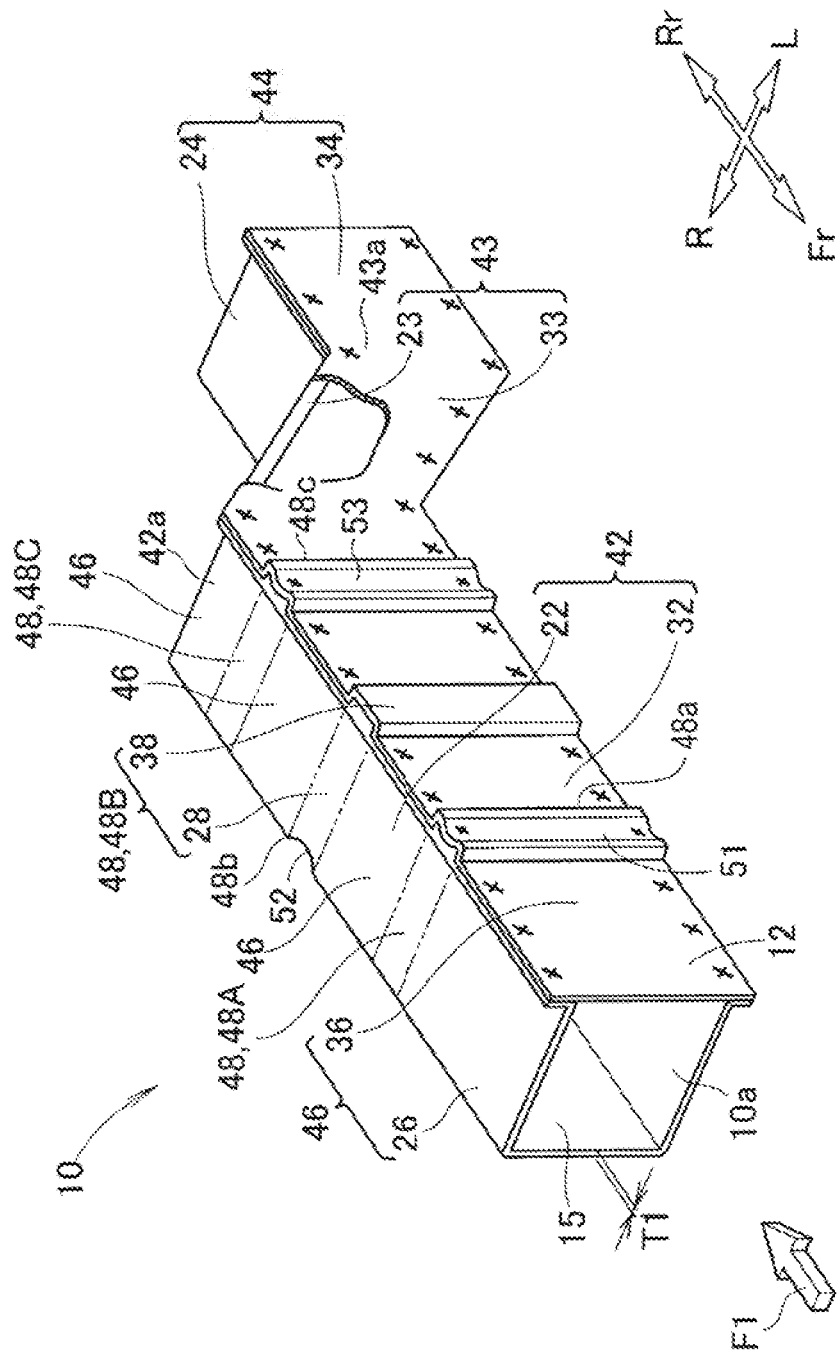
FIG. 3 is a perspective view to explain an impact absorbing section provided to the side frame of FIG. 1.

As illustrated in FIG. 3, the side frame 10 includes an impact absorbing section 42 extending along the vehicle body front-rear direction, a sloping section 43 extending from a rear end 42*a* of the impact absorbing section 42 at a downward gradient toward the vehicle body rear, and a horizontal section 44 extending from a rear end 43*a* of the sloping section 43 toward the vehicle body rear.

The impact absorbing section 42 is formed by the first impact absorbing section 22 and the second impact absorbing section 32. The sloping section 43 is formed by the first sloping section 23 and the second sloping section 33. The horizontal section 44 is formed by the first horizontal section 24 and the second horizontal section 34.

Specifically, the impact absorbing section 42 includes plural ultrahigh strength portions 46 formed with rectangular closed cross-sections (namely with hollow shapes) by the plural first ultrahigh strength portions 26 and the plural second ultrahigh strength portions 36, and plural high strength portions 48 formed with rectangular closed cross-sections (namely with hollow shapes) by the plural first high strength portions 28 and the plural second high strength portions 38.

Plural stress concentrating portions 51 to 53 are respectively formed to the plural high strength portions 48.

Below, from out of the plural high strength portions 48, the high strength portion on the vehicle body front side is referred to as a "front high strength portion 48A", the high strength portion at the vehicle body central portion is referred to as a "central high strength portion 48B", and the high strength portion on the vehicle body rear side is referred to as a "rear high strength portion 48C".

Moreover, the stress concentrating portion provided to the front high strength portion 48A is referred to as the "front stress concentrating portion 51", the stress concentrating portion provided to the central high strength portion 48B is referred to as the "central stress concentrating portion 52", and the stress concentrating portion provided to the rear high strength portion 48C is referred to as the "rear stress concentrating portion 53".

The front stress concentrating portion 51 is formed to the front high strength portion 48A on the surface of an outside portion (side portion) 48*a* on the outside wall 12 side of the side frame 10. The outside portion 48*a* of the front high strength portion 48A is a side portion in the direction the side frame 10 bends toward under an impact load F1 applied to a front end portion 10*a* of the side frame 10.

The front stress concentrating portion 51 is formed with a concave shape (indented shape) indented toward the inside of the side frame 10, so as to concentrate stress under the impact load F1 applied to the front end portion 10*a* of the side frame 10.

The central stress concentrating portion 52 is formed to the surface of an inside portion (side portion) 48*b* of the central high strength portion 48B on the inside wall 15 side of the side frame 10. The inside portion 48*b* of the central high strength portion 48B is a side portion in the direction the side frame 10 bends toward under the impact load F1.

The central stress concentrating portion 52 is, similarly to the front stress concentrating portion 51, formed with a concave shape (indented shape) indented toward the inside of the side frame 10, so as to concentrate stress under the impact load F1.

The rear stress concentrating portion 53 is formed on the surface of an outside portion (side portion) 48*c* of the rear high strength portion 48C on the outside wall 12 side of the side frame 10. The outside portion 48*c* of the rear high strength portion 48C is a side portion in the direction the side frame 10 bends toward under impact load.

The rear stress concentrating portion 53 is, similarly to the front stress concentrating portion 51, formed with a concave shape (indented shape) indented toward the inside of the side frame 10, so as to concentrate stress under the impact load F1.

Thus the front stress concentrating portion 51, the central stress concentrating portion 52, and the rear stress concentrating portion 53 are respectively formed in this manner to the front high strength portion 48A, the central high strength portion 48B, and the rear high strength portion 48C.

The front high strength portion 48A, the central high strength portion 48B, and the rear high strength portion 48C accordingly favorably bend under the impact load F1, enabling the applied impact load F1 to be appropriately absorbed.

Moreover, the front stress concentrating portion 51, the central stress concentrating portion 52, and the rear stress concentrating portion 53 are provided to the impact absorbing section 42 in three locations at intervals along the vehicle body front-rear direction. This thereby enables the front stress concentrating portion 51, the central stress concentrating portion 52, and the rear stress concentrating portion 53 to be provided in all areas of the impact absorbing section 42.

Thus bending can be achieved in all areas of the impact absorbing section 42 under the impact load F1 applied to the side frame 10, enabling an appropriate absorption amount of the impact load F1 to be secured.

The plural ultrahigh strength portions 46 are formed to the impact absorbing section 42 at locations where there is no need for bending under the impact load F1. Accordingly, the sheet thickness T1 of the plural ultrahigh strength portions 46 can be suppressed.

A reduction in weight of the side frame 10 is thereby achieved in state in which the rigidity of the impact absorbing section 42 (namely, of the side frame 10) has been secured.

Figure 4A:
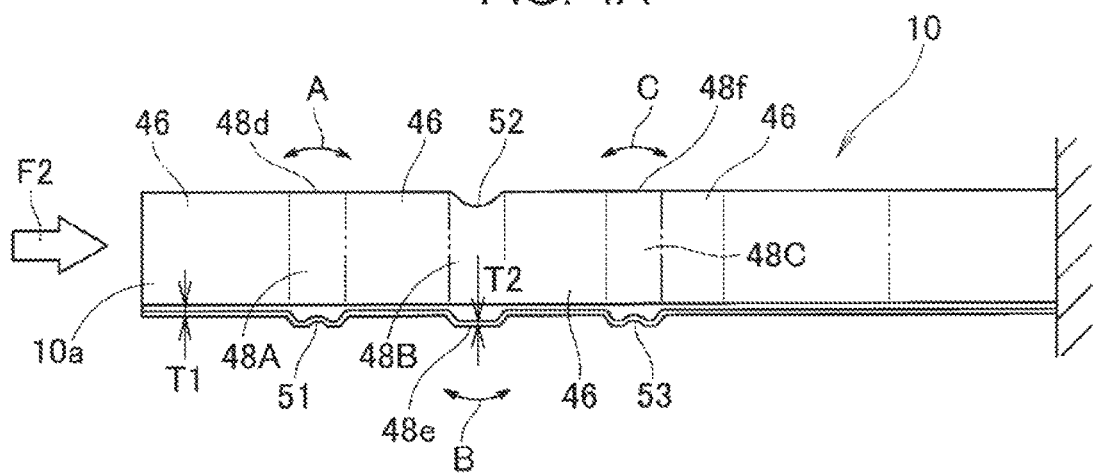
FIG. 4A and FIG. 4B are explanatory diagrams of an example of absorbing impact load using a side frame of Example 1.
Figure 4B:
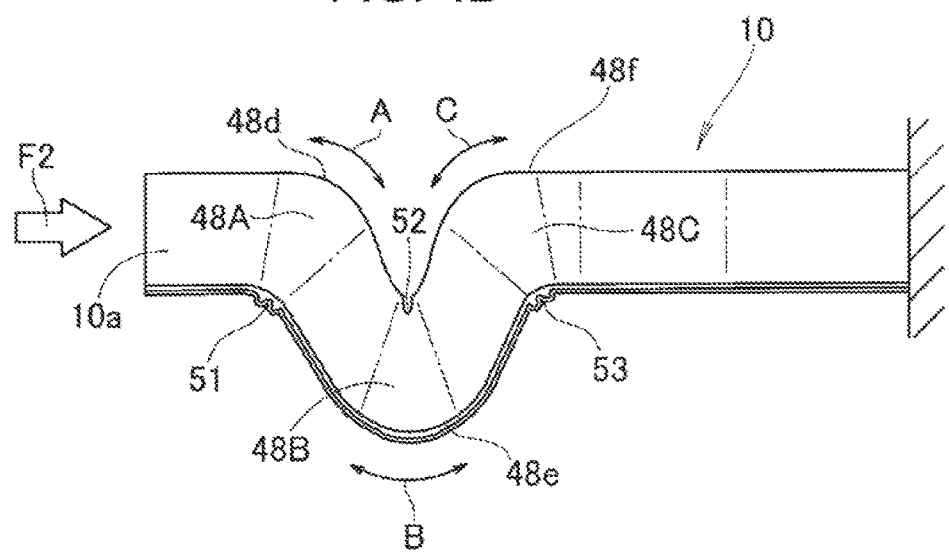

Next, explanation follows regarding an example of absorption of an impact load F2 applied to the front end portion 10a of the side frame 10, with reference to FIG. 4A and FIG. 4B.

As illustrated in FIG. 4A, the impact load F2 is applied to the front end portion 10a of the side frame 10 along the longitudinal direction (axial direction) of the side frame 10. Due to the impact load F2 being applied to the front end portion 10a of the side frame 10, stress is concentrated at the front stress concentrating portion 51, the central stress concentrating portion 52, and the rear stress concentrating portion 53.

The front stress concentrating portion 51, the central stress concentrating portion 52, and the rear stress concentrating portion 53 accordingly act as the bending initiation points (triggers) for the side frame 10.

More specifically, the front high strength portion 48A bends as indicated by the arrow A, with the front stress concentrating portion 51 as the initiation point. The central high strength portion 48B bends as indicated by the arrow B, with the central stress concentrating portion 52 as the initiation point. The rear high strength portion 48C bends as indicated by the arrow C, with the rear stress concentrating portion 53 as the initiation point.

The front high strength portion 48A, the central high strength portion 48B, and the rear high strength portion 48C each have tensile strengths suppressed to 500 to 1000 MPa, and are formed with the sheet thickness T2 greater than the sheet thickness T1 of the ultrahigh strength portions 46.

This thereby enables an amount of stretching of an inside portion 48d of the front high strength portion 48A to be secured. The inside portion 48d is a side portion of the front high strength portion 48A on the opposite side to the front stress concentrating portion 51. An amount of stretching of an outside portion 48e of the central high strength portion 48B can also be secured. The outside portion 48e is a side portion of the central high strength portion 48B on the opposite side to the central stress concentrating portion 52.

Moreover, an amount of stretching of an inside portion 48f of the rear high strength portion 48C can also be secured. The inside portion 48f is a side portion of the rear high strength portion 48C on the opposite side to the rear stress concentrating portion 53.

As illustrated in FIG. 4B, cracking can be suppressed from occurring at the inside portion 48d, the outside portion 48e, and the inside portion 48f when the inside portion 48d of the front high strength portion 48A, the outside portion 48e of the central high strength portion 48B, and the inside portion 48f of the rear high strength portion 48C stretch.

This thereby enables the front high strength portion 48A to be favorably bent as indicated by the arrow A, with the front stress concentrating portion 51 as the initiation point. Furthermore, the central high strength portion 48B can be favorably bent as indicated by the arrow B, with the central stress concentrating portion 52 as the initiation point.

Furthermore, the rear high strength portion 48C can be favorably bent as indicated by the arrow C, with the rear stress concentrating portion 53 as the initiation point.

Thus in this manner, favorable bending of the side frame 10 can be achieved due to favorable bending of the front high strength portion 48A, the central high strength portion 48B, and the rear high strength portion 48C. This thereby enables sufficient absorption of the impact load F2 applied to the side frame 10, enabling an appropriate amount of absorption of the impact load F2 to be secured.

Figure 5:
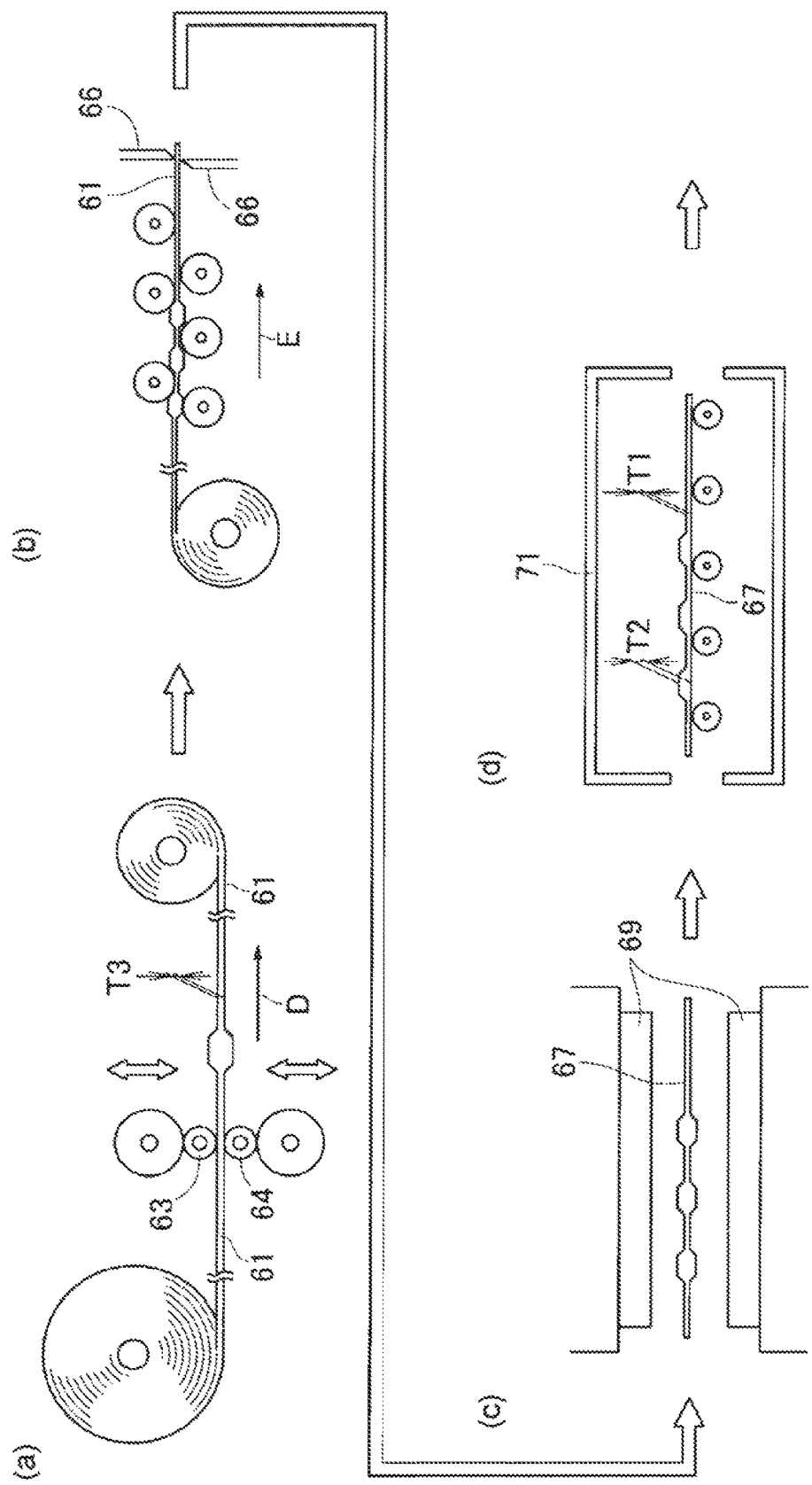
FIG. 5 is an explanatory diagram of a process for manufacturing a blank for a first frame of a side frame of Example 1.
Figure 6:
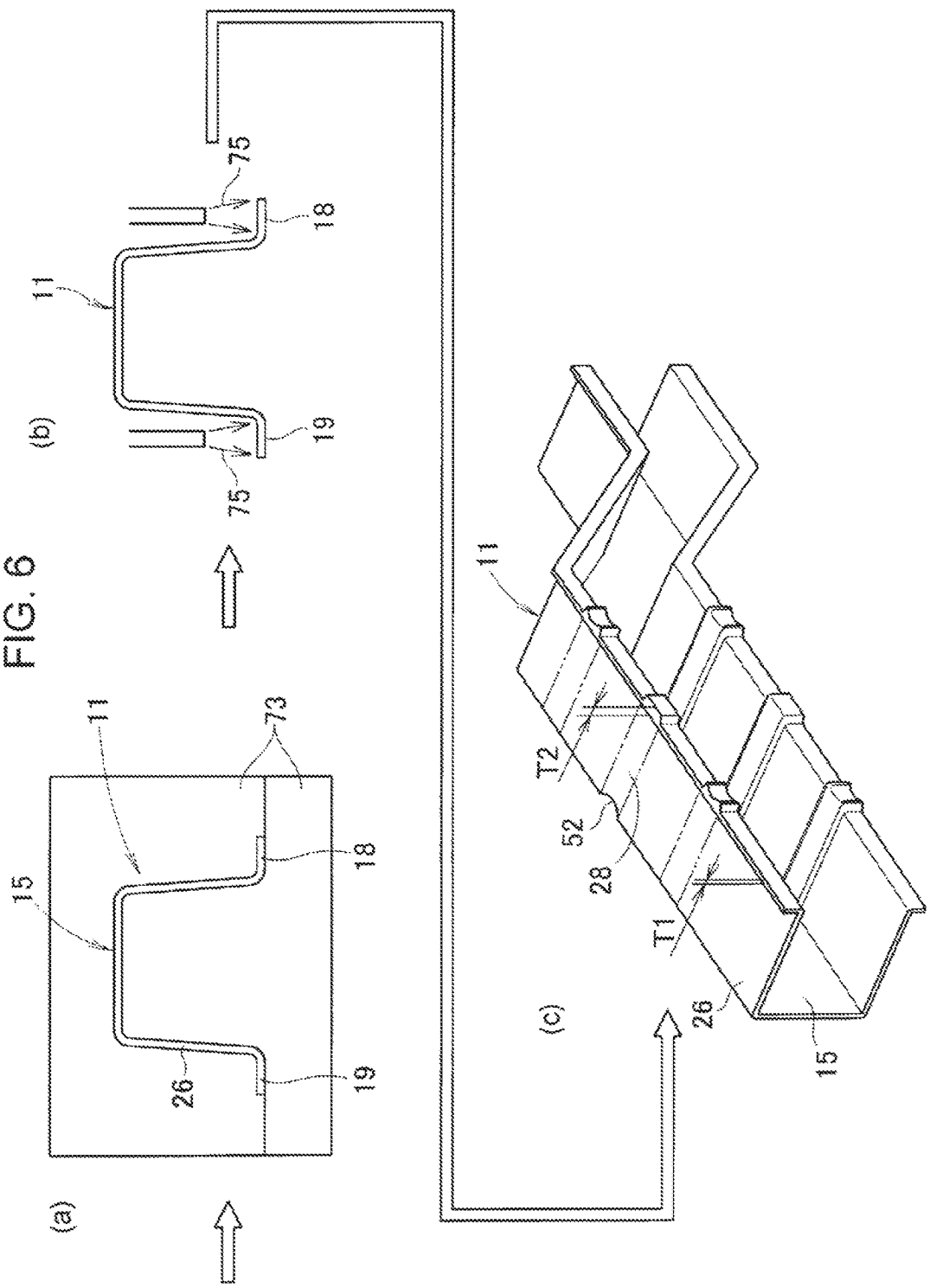
FIG. 6 is an explanatory diagram of a process for manufacturing a first frame of Example 1 by hot stamping.
Figure 7:
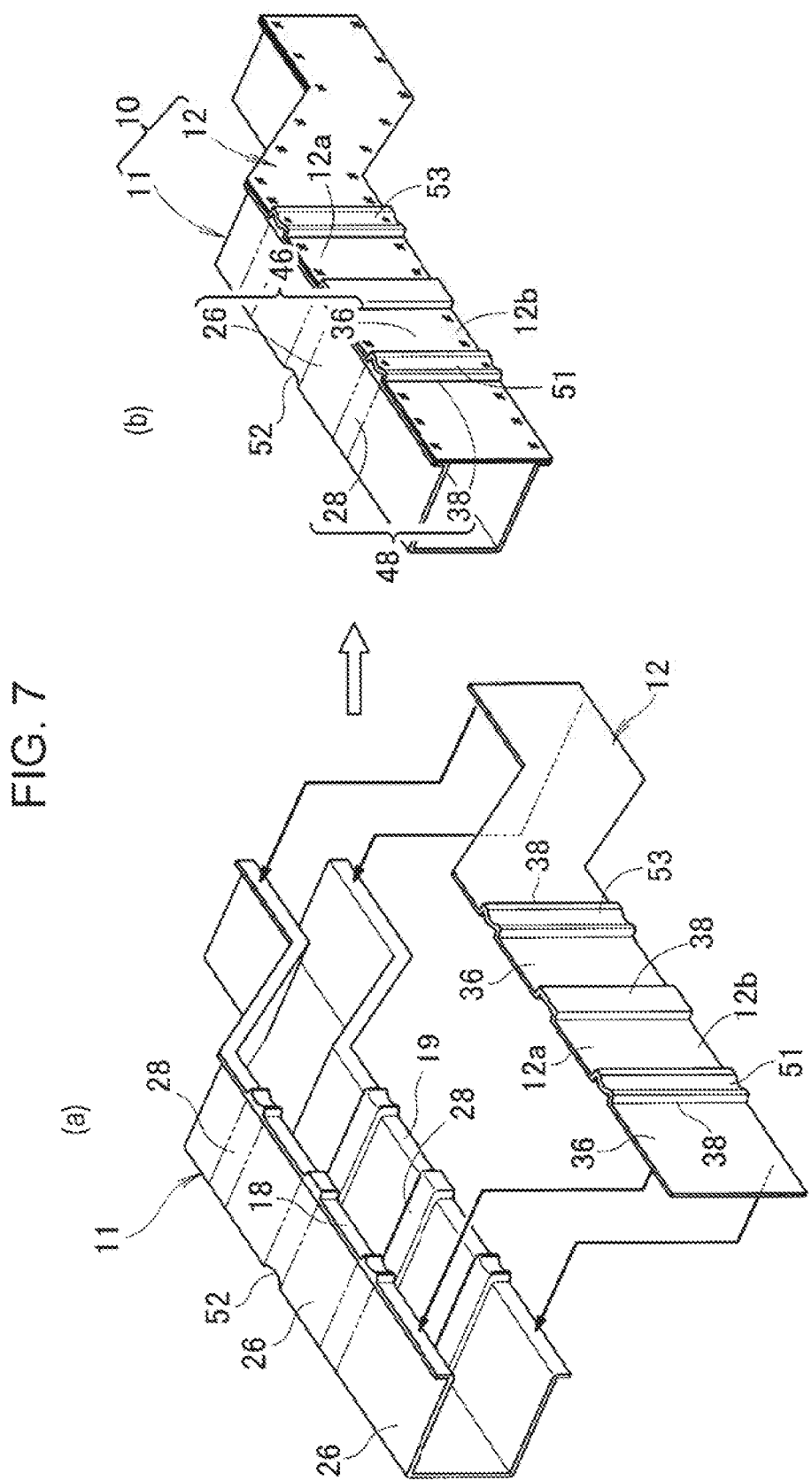
FIG. 7 is an explanatory diagram of a process for joining a first frame and a second frame of a side frame of Example 1 together.

Next, explanation follows regarding processes for manufacturing the side frame 10 by employing a single continuous sheet steel of a tailored rolled blank (tailored rolled blank component), with reference to FIG. 5 to FIG. 7.

Explanation first follows regarding processes for manufacturing the first frame 11 of the side frame 10 by employing a single continuous steel sheet of a tailored rolled blank, with reference to FIG. 5 and FIG. 6.

In a rolling process illustrated at part (a) of FIG. 5, an upper roller 63 and a lower roller 64 are moved in the up-down direction, while rewinding a single steel sheet 61 in roll shape as indicated by the arrow D. In this state, a sheet thickness T3 of the single steel sheet 61 is made to vary locally by rolling the single steel sheet 61 with the upper roller 63 and the lower roller 64.

Due to making the sheet thickness T3 of the single steel sheet 61 vary locally by rolling, the boundaries between different sheet thicknesses can be changed smoothly.

The single steel sheet 61 imparted with different sheet thicknesses T3 is wound into a roll shape.

In a cutting process illustrated at part (b) of FIG. 5, the single steel sheet 61 that has been wound into a roll shape is cut by a cutter 66, while being rewound as indicated by the arrow E. The length of the steel sheet 61 is made to correspond to that of the first frame 11 (see part (c) of FIG. 6) by cutting the single steel sheet 61 with the cutter 66.

In the following, the sheet cut by the cutter 66 is referred to as a blank 67 (see part (c) of FIG. 5).

In a press process illustrated at part (c) of FIG. 5, the blank 67 is made to conform to the sheet thicknesses of the first frame 11 (see part (c) of FIG. 6) by pressing the blank 67 with a mold 69. More specifically, the sheet thicknesses of the blank 67 are made to correspond to the sheet thickness T1 of the first ultrahigh strength portions 26 and the sheet thickness T2 of the first high strength portions 28 (see part (c) of FIG. 6).

In addition, the boundaries between the first ultrahigh strength portions 26 and the first high strength portions 28 where the sheet thicknesses are different to each other may be modified so as to be more rounded by the pressing the blank 67 with the mold 69. This thereby enables the stress to be alleviated from concentrating at the boundaries between the first ultrahigh strength portions 26 and the first high strength portions 28 where the sheet thicknesses are different to each other, and enables the quality of the first frame 11 to be increased.

In a heating process illustrated at part (d) of FIG. 5, the pressed blank 67 is conveyed into a heating oven 71. The blank 67 that has been conveyed into the heating oven 71 is heated by the heating oven 71 to the austenite temperature (namely, to the temperature appropriate for hot stamping of a latter process).

In a hot stamping process illustrated at part (a) of FIG. 6, after the blank 67 has been heated, the blank 67 is hot stamped into the first frame 11 with a cooled mold 73.

The central stress concentrating portion 52 (see part (c) of FIG. 6) is formed to the side wall 15 of the first frame 11 during hot stamping of the first frame 11.

During forming the first frame 11 by hot stamping, the tensile strength of the first frame 11 is raised by rapidly cooling the first frame 11 using the mold 73.

When this is being performed, the tensile strength of part of the first frame 11 can be suppressed to a lower tensile strength during hot stamping by, for example, forming a gap between the mold 73 and the first frame 11, or by adjusting the cooling state of part of the mold 73.

Due to suppressing the tensile strength of part of the first frame 11 to a lower tensile strength, the tensile strength of the first ultrahigh strength portions 26 can be raised so as to exceed 1400 MPa, and the tensile strength of the first high strength portions 28 (see part (c) of FIG. 6) can be suppressed to from 500 to 1000 MPa.

The hot stamping is generally known technology, such as, for example, disclosed in related art Japanese Unexamined Patent Application Publication (Translation of PCT Application) No. 2012-528752.

In a tempering process illustrated at part (b) of FIG. 6, the upper flange 18 and the lower flange 19 of the first frame 11 are heated with a laser 75 so as to temper the upper flange 18 and the lower flange 19.

This thereby enables cracks or the like to be prevented from developing in the upper flange 18 when the upper flange 18 is welded to the upper edge 12a of the second frame 12 (see part (a) of FIG. 7).

Similarly, cracks or the like can be prevented from developing in the lower flange 19 when the lower flange 19 is welded to the lower edge 12b of the second frame 12 (see part (a) of FIG. 7).

A weld portion (not illustrated in the drawings) is formed to the first frame 11 for joining to the vehicle body. The weld portion is also tempered with the laser 75 in the tempering process.

As illustrated at part (c) of FIG. 6, tempering the first frame 11 completes the manufacturing processes of the first frame 11 so as to obtain the first frame 11 with the substantially hat shaped cross-section.

Thus the processes from part (a) of FIG. 5 to part (c) of FIG. 6 enable different sheet thicknesses to be imparted to the first ultrahigh strength portions 26 and the first high strength portions 28 of the first frame 11, and moreover enable different tensile strengths to be imparted to the first ultrahigh strength portions 26 and the first high strength portions 28.

Next, explanation follows regarding processes for manufacturing the second frame 12 of the side frame 10 illustrated in FIG. 7 using a single steel sheet of a tailored rolled blank.

The second frame 12 of the side frame 10 is also manufactured by similar processes to those of the first frame 11. Explanation of the manufacturing processes of the second frame 12 is therefore omitted.

In the hot stamping process for the second frame 12, similarly to the first frame 11, the front stress concentrating portion 51 is formed to the second high strength portion 38 on the vehicle body front side, and the rear stress concentrating portion 53 is formed to the second high strength portion 38 on the vehicle body rear side.

In a tempering process of the second frame 12, similarly to the first frame 11, the upper edge 12a and the lower edge 12b of the second frame 12 are tempered by heating with a laser 75 (see part (b) of FIG. 6).

This thereby enables cracks or the like to be prevented from developing in the upper edge 12a of the second frame 12 during welding the upper edge 12a of the second frame 12 to the upper flange 18. Similarly, cracks or the like can be prevented from developing in the lower edge 12b of the second frame 12 during welding the lower edge 12b of the second frame 12 to the lower flange 19.

Next, explanation follows regarding a process for joining the first frame 11 and the second frame 12 of the side frame 10, with reference to FIG. 7.

As illustrated at part (a) and part (b) of FIG. 7, after the first frame 11 and the second frame 12 have been manufactured, the upper flange 18 of the first frame 11 and the upper edge 12a of the second frame 12 are welded together by spot welding. The lower flange 19 of the first frame 11 and the lower edge 12b of the second frame 12 are also welded together by spot welding.

The side frame 10 is thereby formed by the first frame 11 and the second frame 12, completing the manufacturing processes of the side frame 10.

As illustrated in FIG. 5 to FIG. 7, the side frame 10 is formed by two members, these being the first frame 11 and the second frame 12. The first frame 11 and the second frame 12 are formed by employing a tailored rolled blank. Thus the sheet thicknesses of the first frame 11 and the second frame 12 can each be made to change to different sheet thicknesses at a desired location by rolling when in the tailored rolled blank state (namely, while as a single elongated strip shaped steel sheet).

The quality of the side frame 10 can accordingly be secured by making the sheet thicknesses of the first frame 11 and the second frame 12 each change smoothly to different sheet thicknesses by rolling.

Next, explanation follows regarding Example 2 to Example 4, with reference to FIG. 8 to FIG. 25C. Members in Example 2 to Example 4 that are the same or similar to each of the respective configuration members in Example 1 are appended with the same reference numerals as those in Example 1, and detailed explanation thereof is omitted.

Example 2

Explanation follows regarding a vehicle body side frame 80 according to Example 2.

In the following, the vehicle body side frame 80 is abbreviated to "side frame 80".

Figure 8:
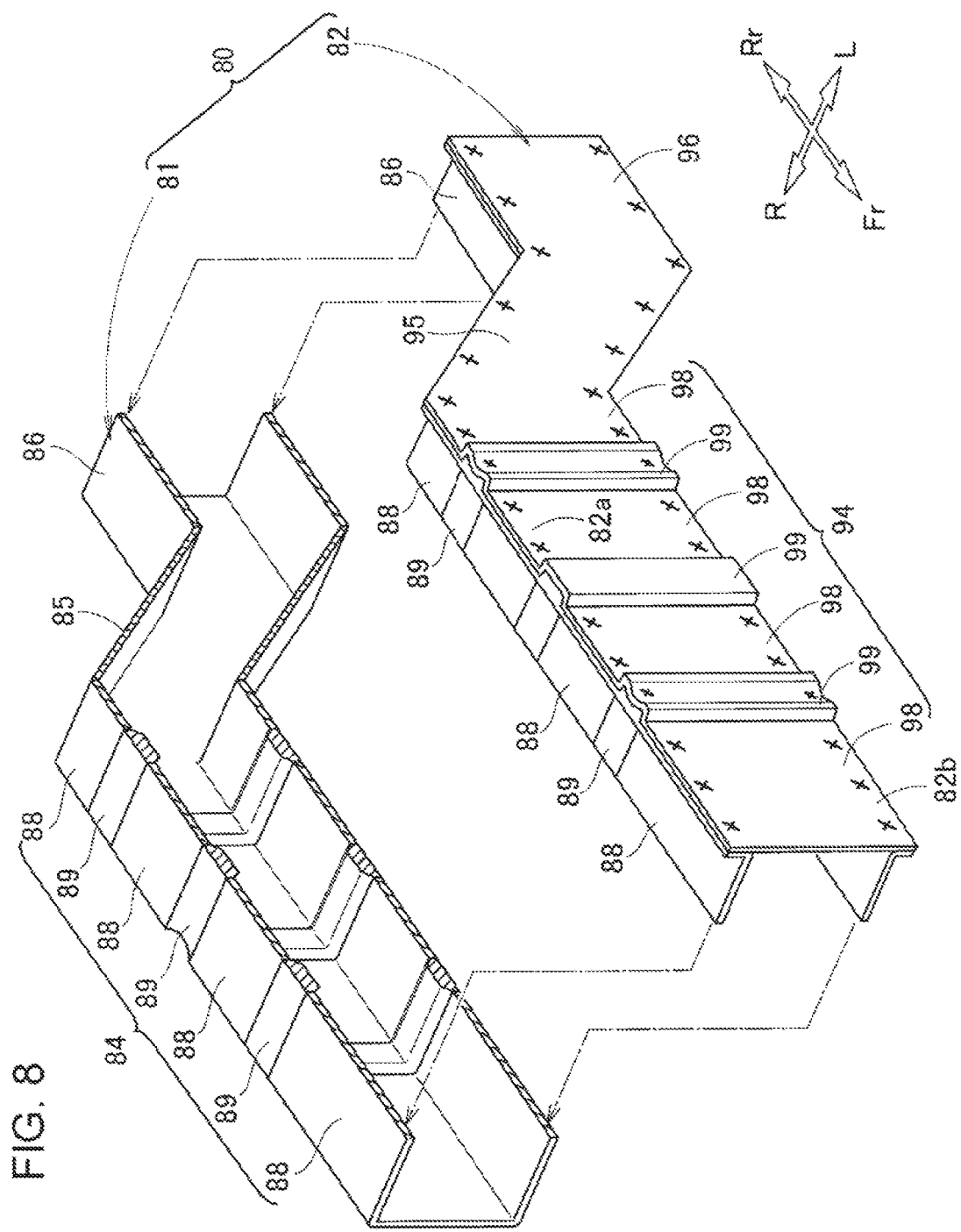
FIG. 8 is a perspective view illustrating a state in which a vehicle body side frame of Example 2 according to the present application has been divided along the longitudinal direction.
Figure 9:
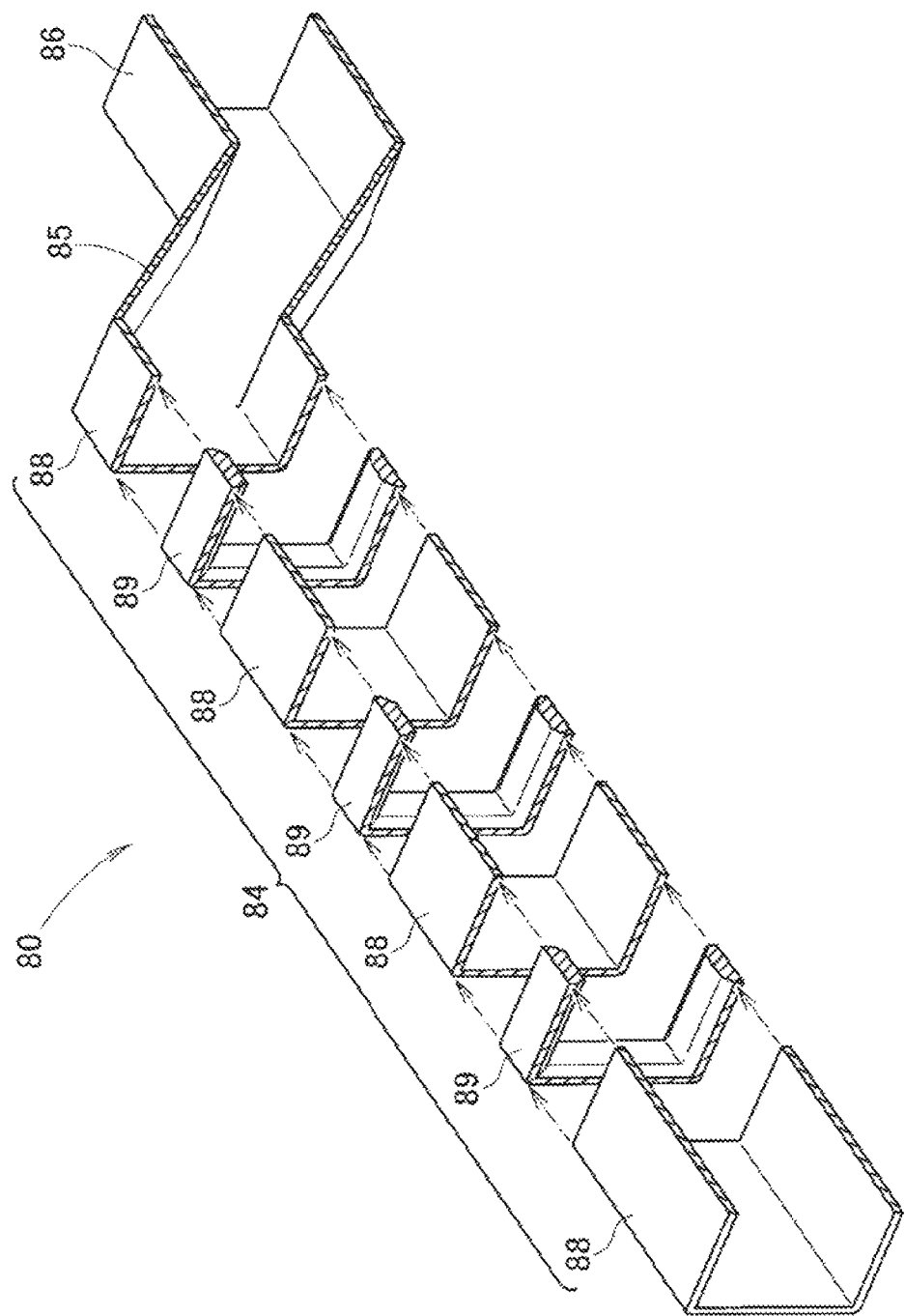
FIG. 9 is an exploded perspective view illustrating a divided state of the first frame of FIG. 8.

As illustrated in FIG. 8, and FIG. 9, the side frame 80 includes a first frame 81 in place of the first frame 11 of Example 1 and includes a second frame 82 in place of the second frame 12 of Example 1, but other configuration is similar to that of the side frame 10 of Example 1.

The first frame 81 is formed in a similar shape to the first frame 11 of the left frame of Example 1, and includes a first impact absorbing section 84, a first sloping section 85, and a first horizontal section 86. The first frame 81 is formed by employing a tailored blank (tailored blank component) of joined members of different sheet thicknesses.

The first impact absorbing section 84 includes plural first ultrahigh strength portions 88 and plural first high strength portions 89 formed by employing the tailored blank.

The first ultrahigh strength portions 88 are, similarly to the first ultrahigh strength portions 26 of Example 1, locations having a tensile strength exceeding 1400 MPa and are formed with a sheet thickness T1.

The first ultrahigh strength portion 88 at the vehicle body rear is integrally formed to the first sloping section 85 and the first horizontal section 86.

The first high strength portions 89 are, similarly to the first high strength portions 28 of Example 1, locations where the tensile strength is suppressed to from 500 to 1000 MPa, and are formed with a sheet thickness T2 greater than the sheet thickness T1 of the first ultrahigh strength portions 88.

The first ultrahigh strength portions 88 and the first high strength portions 89 are members having different sheet thicknesses to each other.

The first ultrahigh strength portions 88 and the first high strength portions 89, of different sheet thicknesses to each other, are alternately disposed and joined by welding together in a state in which adjacent first ultrahigh strength portions 88 and first high strength portions 89 abut each other. Namely, the first frame 11 is formed by employing the tailored blank (tailored blank component) in which the first ultrahigh strength portions 88 and the first high strength portions 89 of different sheet thicknesses have been joined.

Thus the first impact absorbing section 84 is formed in a similar shape to that of the first impact absorbing section 22 of Example 1 by the plural first ultrahigh strength portions 88 and the plural first high strength portions 89.

The second frame 82 is formed in a similar shape to that of the second frame 12 of Example 1, and includes a second impact absorbing section 94, a second sloping section 95, and a second horizontal section 96. The second frame 82 is formed by employing a tailored blank (tailored blank component) of joined members of different sheet thicknesses.

The second impact absorbing section 94 includes plural second ultrahigh strength portions 98 and plural second high strength portions 99 formed by employing the tailored blank.

The second ultrahigh strength portions 98 are, similarly to the second ultrahigh strength portions 36 of Example 1, locations where the tensile strength exceeds 1400 MPa and are formed with a sheet thickness T1.

The second ultrahigh strength portion 98 at the vehicle body rear is integrally formed to the second sloping section 95 and the second horizontal section 96.

The second high strength portions 99 are, similarly to the second high strength portions 38 of Example 1, locations where the tensile strength is suppressed to from 500 to 1000 MPa, and are each formed with a sheet thickness T2 greater than the sheet thickness T1 of the second ultrahigh strength portions 98.

The second ultrahigh strength portions 98 and the second high strength portions 99 are members having different sheet thicknesses to each other.

The second ultrahigh strength portions 98 and the second high strength portions 99, of different sheet thicknesses to each other, are alternately disposed and joined by welding together in a state in which adjacent second ultrahigh strength portions 98 and second high strength portions 99 abut each other. Namely, the second frame 82 is formed by employing the tailored blank (tailored blank component) in which the plural second ultrahigh strength portions 98 and the plural second high strength portions 99 of different sheet thicknesses to each other have been joined together.

Thus the second impact absorbing section 94 is formed by the plural second ultrahigh strength portions 98 and the plural second high strength portions 99 in a similar shape to the second impact absorbing section 32 of Example 1.

The side frame 80 is formed in this manner from two members, these being the first frame 81 and the second frame 82. The first frame 81 is formed by employing a tailored blank of the joined first ultrahigh strength portions 88 and first high strength portions 89 of different sheet thicknesses to each other.

The sheet thicknesses of the first frame 81 can be made to differ at a desired location by joining together the first ultrahigh strength portions 88 and the first high strength portions 89 of different sheet thicknesses.

Similarly, the second frame 82 is formed by employing the tailored blank of the joined second ultrahigh strength portions 98 and the second high strength portions 99 of different sheet thicknesses.

The sheet thicknesses of the second frame 82 can be made to differ at a desired location by joining together the second ultrahigh strength portions 98 and the second high strength portions 99 of different sheet thicknesses.

Similarly to in Example 1, an upper flange of the first frame 81 and an upper edge 82*a* of the second frame 82 are welded together by spot welding. A lower flange of the first frame 81 and a lower edge 82*b* of the second frame 82 are welded together by spot welding. The side frame 80 is thereby formed by the first frame 81 and the second frame 82.

In this state, the ultrahigh strength portions of the side frame 80 are formed by the first ultrahigh strength portions 88 and the second ultrahigh strength portions 98. Moreover, the high strength portions of the side frame 80 are formed by the first high strength portions 89 and the second high strength portions 99.

Thus the sheet thickness of the side frame 80 can be made to differ at the locations of the ultrahigh strength portions and the high strength portions, similarly to in the side frame 10 of Example 1. Similarly to in the side frame 10 of Example 1, this thereby enables a reduction in weight of the side frame 80 to be achieved, and an appropriate amount of absorption of impact load applied to the side frame 80 to be secured.

Example 3

Explanation follows regarding a vehicle body side frame 110 according to an Example 3.

In the following, the vehicle body side frame 110 is abbreviated to "side frame 110".

Figure 10:
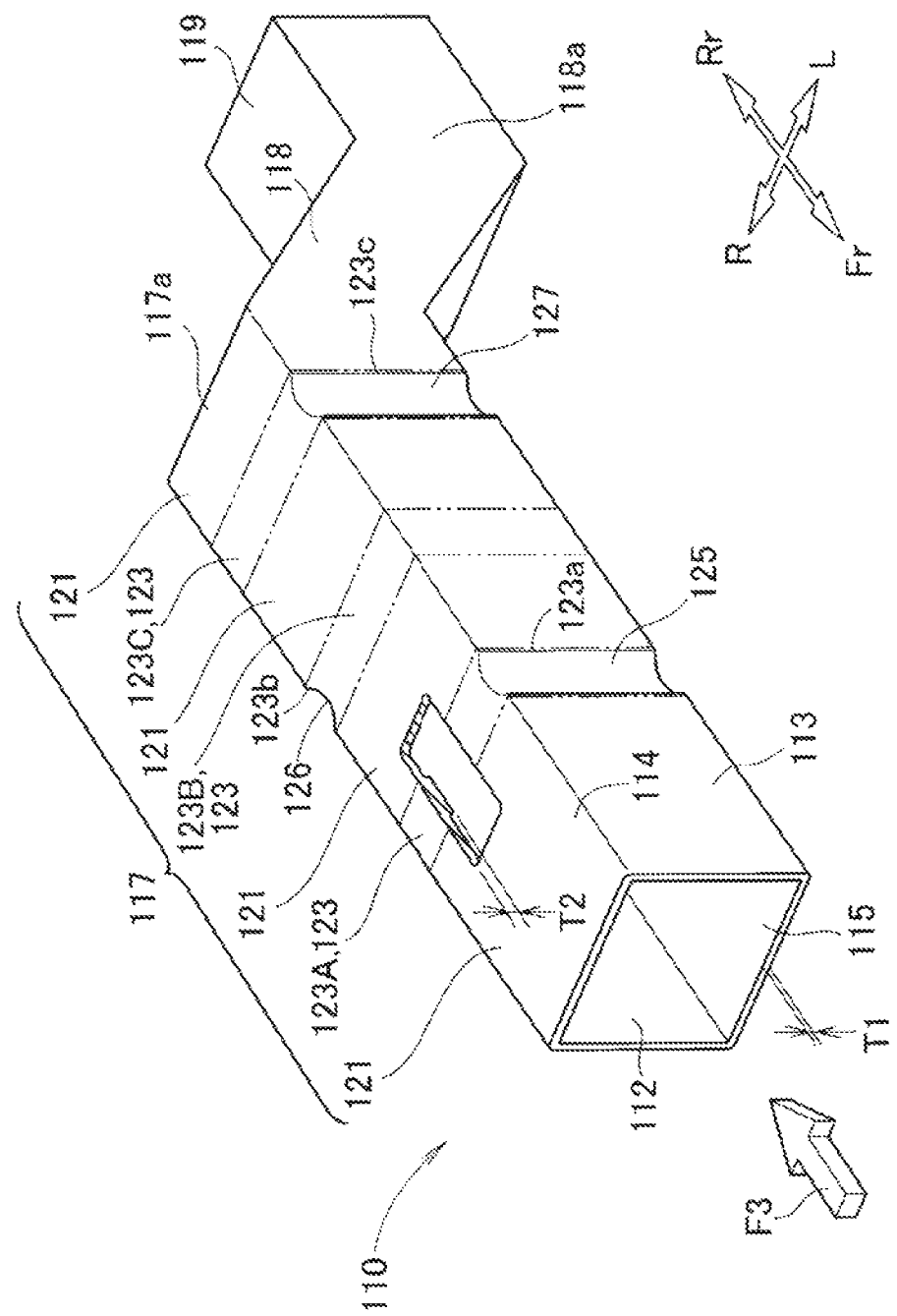
FIG. 10 is a perspective view illustrating a vehicle body side frame of Example 3 according to the present application.

As illustrated in FIG. 10, the side frame 110 is formed by a single steel sheet by rolling and three-dimensionally hot bending. Other configuration is similar to that of the side frame 10 of Example 1.

The side frame 110, similarly to the side frame 10 of Example 1, includes an inside wall 112, an outside wall 113, a top section 114, and a bottom section 115. The side frame 110 is formed by the inside wall 112, the outside wall 113, the top section 114, and the bottom section 115 in a rectangular closed cross-section hollow shape.

The side frame 110 includes, similarly to the side frame 10 of Example 1, an impact absorbing section 117 extending in the vehicle body front-rear direction, a sloping section 118 extending from a rear end 117a of the impact absorbing section 117 at a downward gradient toward the vehicle body rear, and a horizontal section 119 extending from a rear end 118a of the sloping section 118 toward the vehicle body rear.

The impact absorbing section 117 includes plural ultrahigh strength portions 121 formed with rectangular closed cross-sections (namely with hollow shapes), and plural high strength portions 123 formed with rectangular closed cross-sections (namely with hollow shapes). Plural stress concentrating portions 125 to 127 are respectively formed to the plural high strength portions 123.

The ultrahigh strength portions 121 are locations where the tensile strength exceeds 1400 MPa and are formed with a sheet thickness T1.

The high strength portions 123 are locations where the tensile strength is suppressed to from 500 to 1000 MPa, and are each formed with a sheet thickness T2 greater than the sheet thickness T1 of the ultrahigh strength portions 121.

In the following explanation, from out of the plural high strength portions 123, the high strength portion on the vehicle body front side will be referred to as the "front high strength portion 123A", the high strength portion at the vehicle body center portion will be referred to as the "central high strength portion 123B", and the high strength portion on the vehicle body rear side will be referred to as the "rear high strength portion 123C".

The stress concentrating portion provided at the front high strength portion 123A will also be referred to as the "front stress concentrating portion 125", the stress concentrating portion provided to the central high strength portion 123B will also be referred to as the "central stress concentrating portion 126", and the stress concentrating portion provided to the rear high strength portion 123C will also be referred to as the "rear stress concentrating portion 127".

The front stress concentrating portion 125 is formed, on the front high strength portion 123A, in a concave shape (indented shape) on the surface of an outside portion (side portion) 123a on the outside wall 113 side of the side frame 110.

The central stress concentrating portion 126 is formed, on the central high strength portion 123B, in a concave shape (indented shape) on the surface of an inside portion (side portion) 123b on the inside wall 112 side of the side frame 110.

The rear stress concentrating portion 127 is formed, on the rear high strength portion 123C, in a concave shape (indented shape) on the surface of an outside portion (side portion) 123c on the outside wall 113 side of the side frame 110.

The front stress concentrating portion 125, the central stress concentrating portion 126, and the rear stress concentrating portion 127 are accordingly respectively formed to the front high strength portion 123A, the central high strength portion 123B, and the rear high strength portion 123C.

The front high strength portion 123A, the central high strength portion 123B, and the rear high strength portion 123C accordingly undertake favorable bending under an impact load F3. This thereby enables, similarly to in the side frame 10 of the Example 1, the impact load F3 applied to the side frame 110 to be appropriately absorbed by the impact absorbing section 117.

The plural ultrahigh strength portions 121 are formed on the impact absorbing section 117 at locations where there is no need for bending under the impact load F3. Accordingly, the sheet thickness T1 of the plural ultrahigh strength portions 121 can be suppressed.

Thus, similarly to in the side frame 10 of Example 1, a reduction in weight of the side frame 110 can be achieved in a state in which the rigidity of the side frame 110 has been secured.

Figure 11:
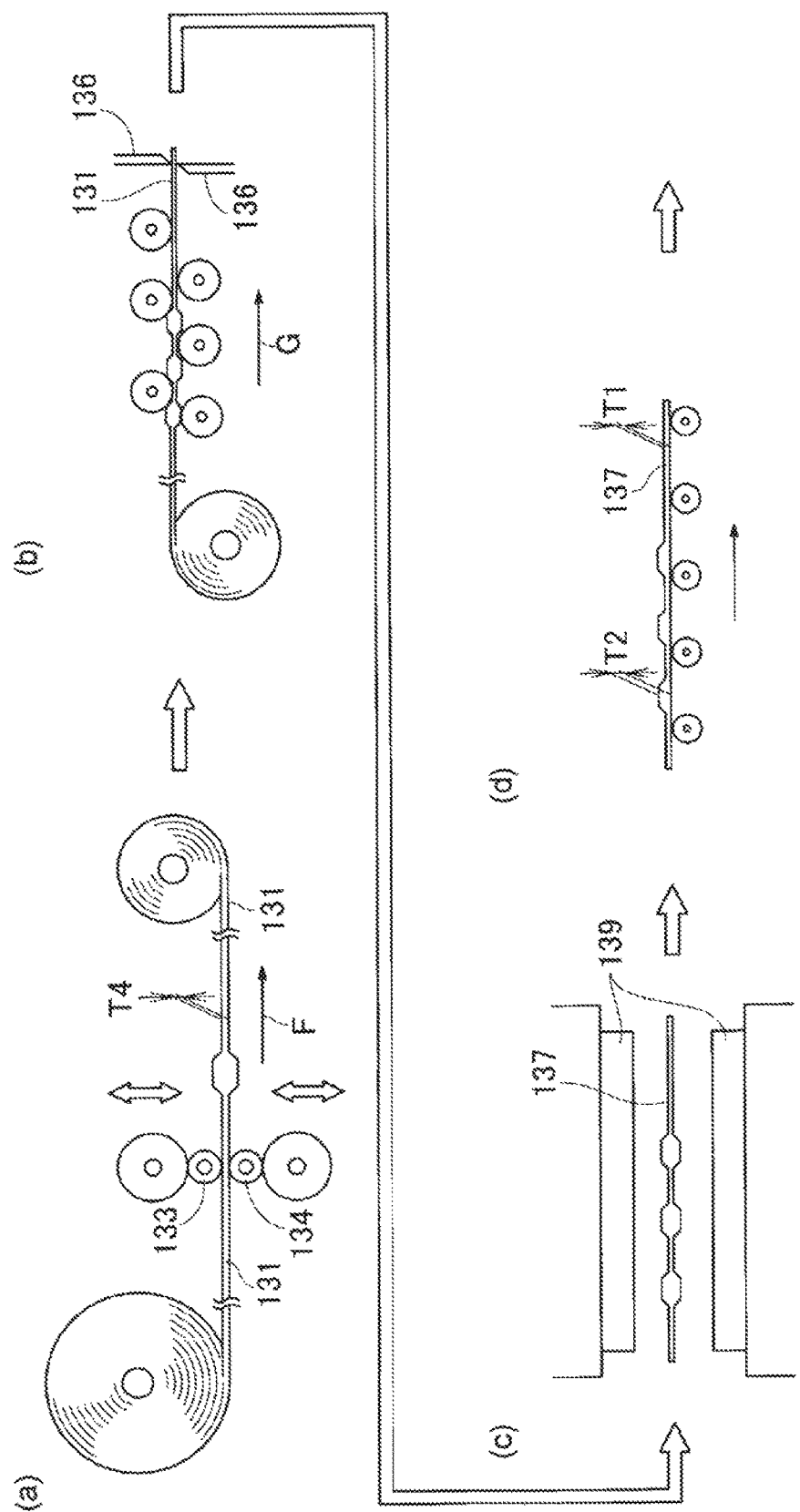
FIG. 11 is an explanatory diagram illustrating a process for manufacturing a blank for a first frame of a side frame of Example 3.
Figure 12:
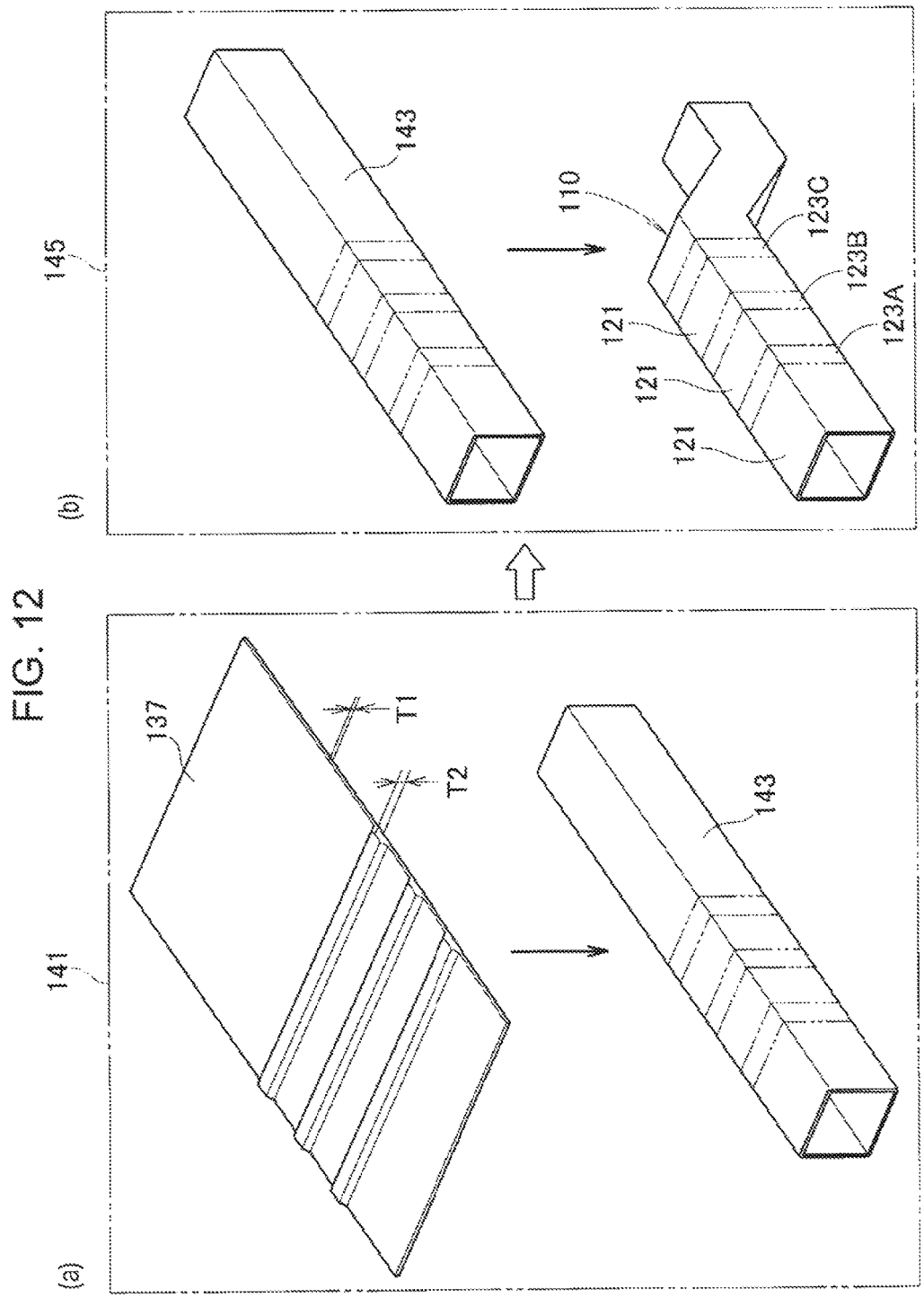
FIG. 12 is an explanatory diagram illustrating an example of forming a side frame from the blank of FIG. 11.

Next, explanation follows regarding processes for manufacturing the side frame 110, with reference to FIG. 11 to FIG. 12. Note that a rolling process at part (a) of FIG. 11, a cutting process at part (b) of FIG. 11, and a press process at part (c) of FIG. 11, are similar to the respective processes at part (a) of FIG. 5, at part (b) of FIG. 5, and at part (c) of FIG. 5 of Example 1, and so detailed explanation will be omitted.

In the rolling process at part (a) of FIG. 11, an upper roller 133 and a lower roller 134 are moved in the up-down direction, while rewinding a single steel sheet 131 in a roll shape as indicated by the arrow F, so as to make a sheet thicknesses T4 of the single steel sheet 131 different at each portion thereof.

The single steel sheet 131 imparted with different sheet thicknesses T4 is wound into a roll shape.

In the cutting process illustrated at part (b) of FIG. 11, the single steel sheet 131 that has been wound into a roll shape is cut into blank 137 by a cutter 136 while being rewound as indicated by arrow G (see part (c) of FIG. 11). The length of the blank 137 is made to correspond to that of the side frame 110 (see part (b) of FIG. 12).

In the press process illustrated at part (c) of FIG. 11, the blank 137 is made to conform to the sheet thicknesses of the side frame 110 by pressing the blank 137 with a mold 139.

More specifically, the sheet thicknesses of the blank 137 are made to correspond to the sheet thickness T1 of the ultrahigh strength portions 121 (see part (b) of FIG. 12) and the sheet thickness T2 of the high strength portions 123 (see part (b) of FIG. 12).

In a conveying process at part (d) of FIG. 11, the sheet shaped blank 137 is pressed, and then the press formed blank 137 is conveyed to a roll forming section 141 (see part (a) of FIG. 12).

In a roll forming process at part (a) of FIG. 12, the sheet shaped blank 137 conveyed to the roll forming section 141 is formed into a roll by rollers in the roll forming section. The sheet shaped blank 137 is thereby formed into a hollow member 143 having a rectangular closed cross-section.

Roll forming is generally known technology for forming a sheet member into a closed cross-section shape.

The hollow member 143 formed by the roll forming section 141 is conveyed to a three-dimensionally hot bending section 145 (see part (b) of FIG. 12).

In the three-dimensionally hot bending at part (b) of FIG. 12, the three-dimensionally hot bending section 145 includes plural support rollers for use in bending. The plural support rollers are supported so as to be adjustable in the up-down direction and in the left-right direction, and are supported such that the angle in the up-down direction and the angle in the left-right direction is also adjustable.

The hollow member 143 is conveyed to the three-dimensionally hot bending section 145 and then is formed into the side frame 110 through three-dimensionally bending in which the plural support rollers are properly adjusted.

Forming the side frame 110 using the three-dimensionally hot bending section 145 in this manner eliminates the need for a mold to be used to form the side frame 110.

Furthermore, forming the side frame 110 using the plural support rollers of the three-dimensionally hot bending section 145 enables the length of the side frame 110, and the shape of the side frame 110, to be changed as desired. This thereby enables multiple types of side frame to be accommodated, and achieves an increase in the range of side frame applications.

The three-dimensionally hot bending section 145 includes a heating device and a cooling device. Thus when performing three dimensional bending of the side frame 110 using the plural support rollers, the side frame 110 is hardened, and the tensile strength of the side frame 110 is raised so as to exceed 1400 MPa.

The three-dimensionally hot bending is generally known technology, such as, for example, disclosed in Japanese Unexamined Patent Application Publication No. 2012-144253, the entire contents of which are incorporated herein by reference.

Figure 13:
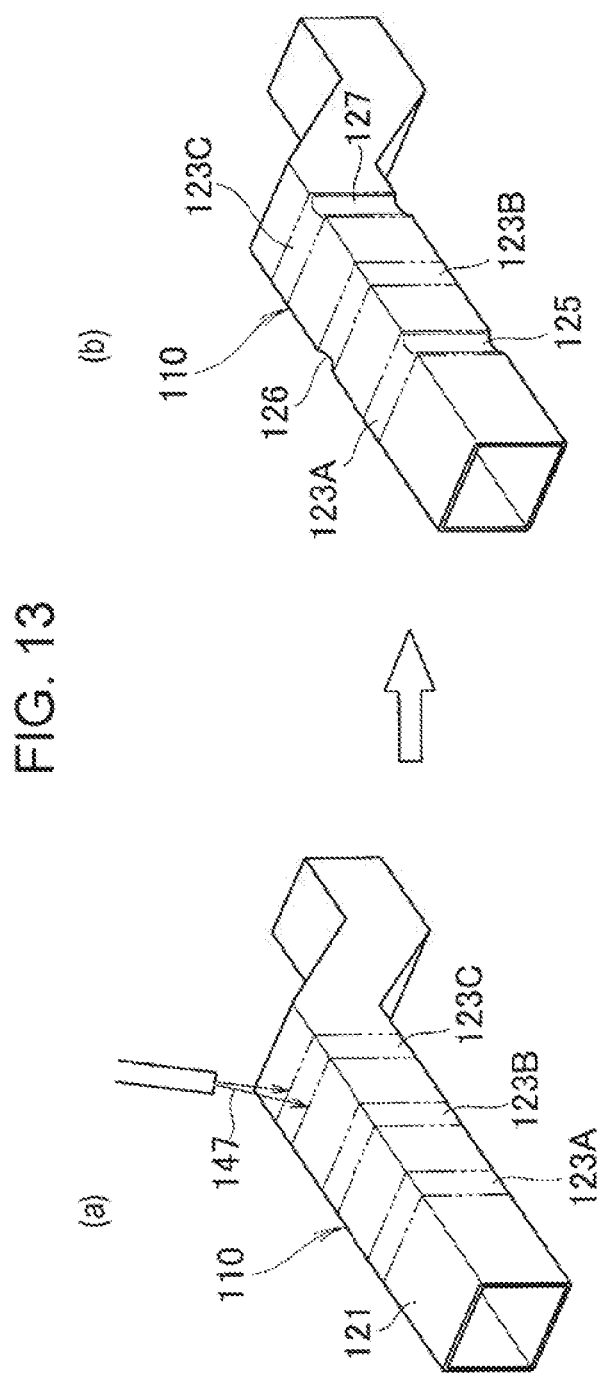
FIG. 13 is an explanatory diagram of an example of forming stress concentrating portions on the side frame of FIG. 12.

In a tempering process at part (a) of FIG. 13, the front high strength portion 123A, the central high strength portion 123B, and the rear high strength portion 123C of the side frame 110 formed in the three-dimensionally hot bending section 145 (see part (b) of FIG. 12) are tempered by heating with a laser 147.

The tensile strength of the front high strength portion 123A, the central high strength portion 123B, and the rear high strength portion 123C is thereby suppressed to from 500 to 1000 MPa.

In a fabrication process at part (b) of FIG. 13, the front stress concentrating portion 125, the central stress concentrating portion 126, and the rear stress concentrating portion 127 are respectively fabricated in the tempered front high strength portion 123A, central high strength portion 123B, and rear high strength portion 123C of the side frame 110.

The side frame 110 is thereby formed, completing the manufacturing processes of the side frame 110.

Example 4

Explanation follows regarding a vehicle body side frame according to an Example 4.

Figure 14:
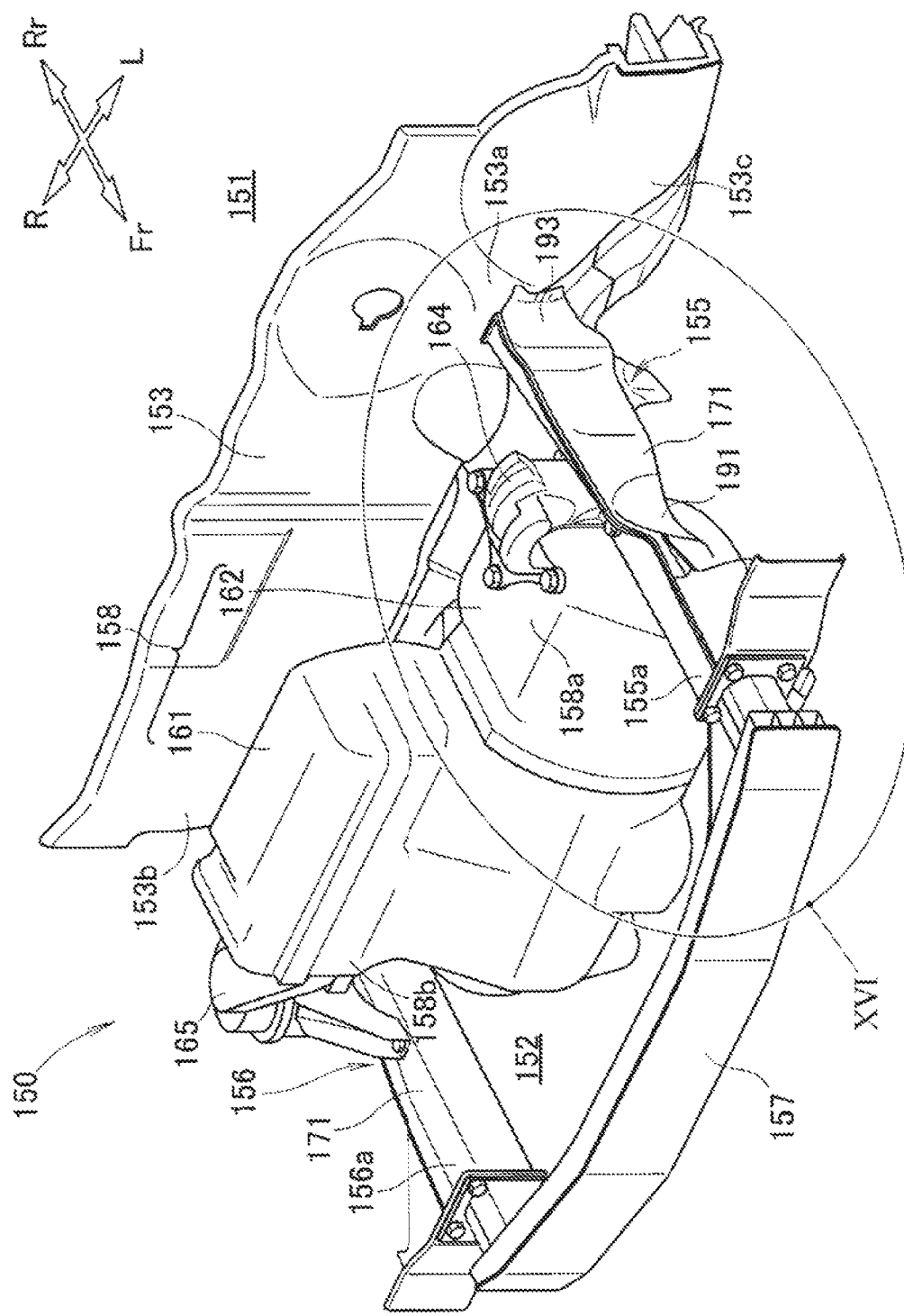
FIG. 14 is a perspective view illustrating a vehicle body front section structure including a front side frame of Example 4 of the present application.
Figure 15:
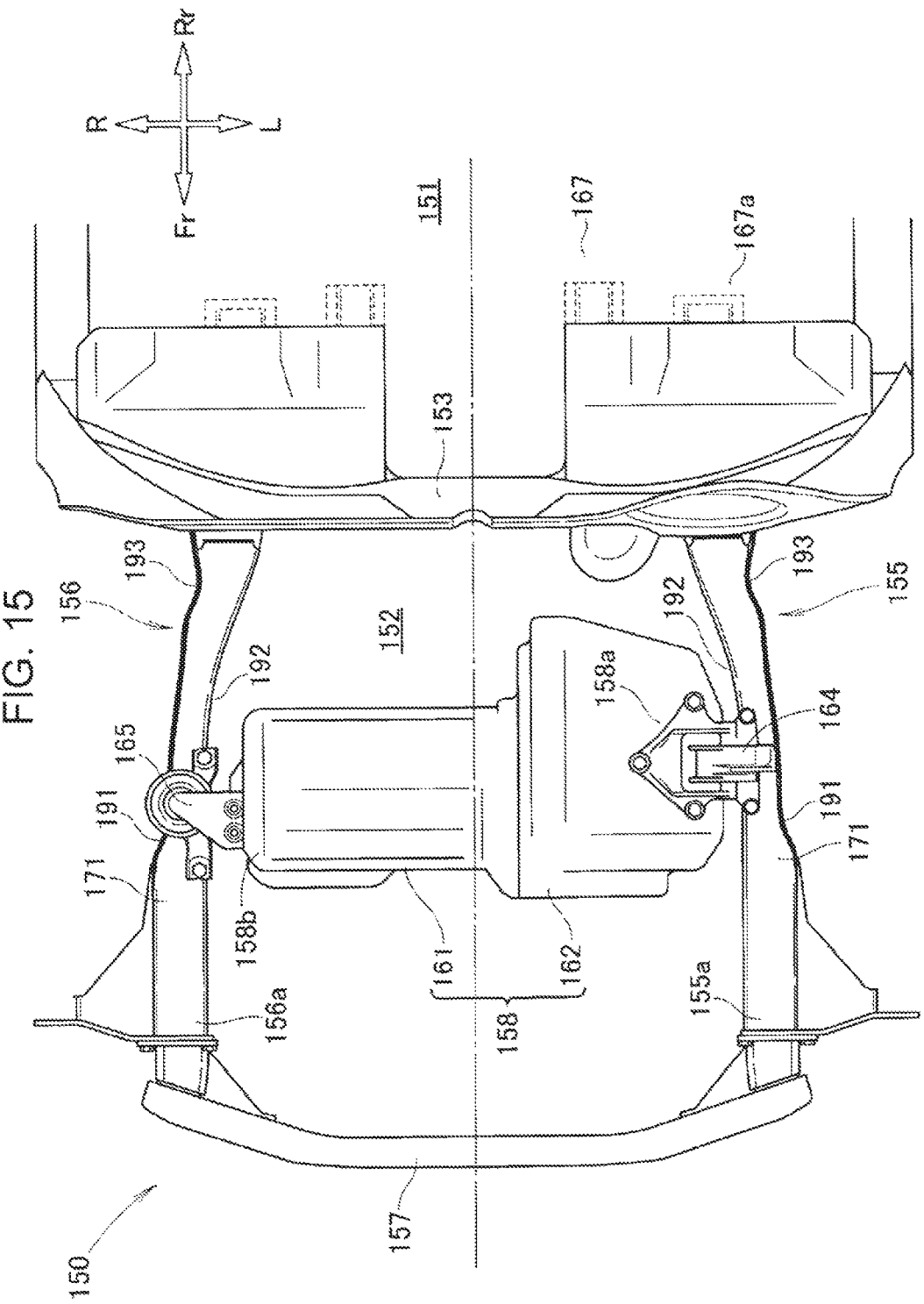
FIG. 15 is a plan view of FIG. 14.

As illustrated in FIG. 14 and FIG. 15, the vehicle body side frame is employed as a left front side frame 155 and as a right front side frame 156 of a vehicle body front structure 150.

Namely, the vehicle body front structure 150 includes a lower dashboard 153 partitioning between a vehicle cabin 151 and an engine room 152 of a vehicle, the left front side frame 155 extending from a left end 153a of the lower dashboard 153 toward the vehicle body front, and the right front side frame 156 extending from a right end 153b of the lower dashboard 153 toward the vehicle body front.

The vehicle body front structure 150 also includes a bumper beam 157 spanning between a front end portion 155a of the left front side frame 155 and a front end portion 156a of the right front side frame 156, and a power unit 158 supported by the left front side frame 155 and the right front side frame 156.

The engine room 152 is partitioned off by the lower dashboard 153, the left front side frame 155, the right front side frame 156, and the bumper beam 157. The power unit 158 is disposed in the engine room 152.

An integrated unit, including an engine 161 and a transmission 162, is, for example, employed as the power unit 158. A left side portion 158a of the power unit 158 is supported by the left front side frame 155 using a left support 164. A right side portion 158b of the power unit 158 is supported by the right front side frame 156 using a right support 165.

The left front side frame 155 and the right front side frame 156 are members that are substantially left-right symmetrical to each other. Each part of the configuration of the right front side frame 156 is appended with the same reference numerals as those of the left front side frame 155, and detailed explanation will be omitted thereof.

In the following detailed explanation, the left front side frame 155 will be referred to simply as "front side frame 155".

Figure 16:
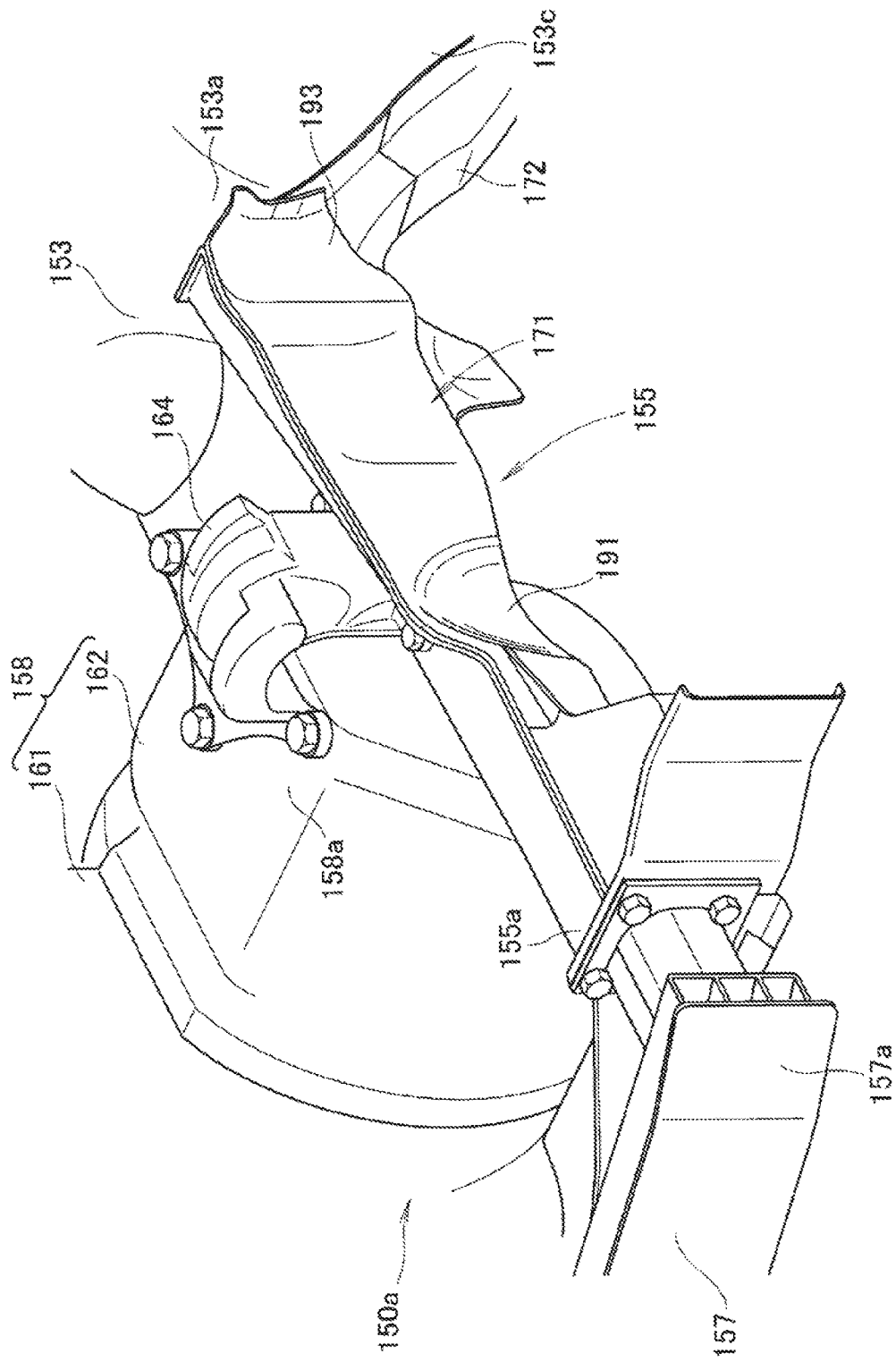
FIG. 16 is an enlargement of area XVI in FIG. 14.
Figure 17:
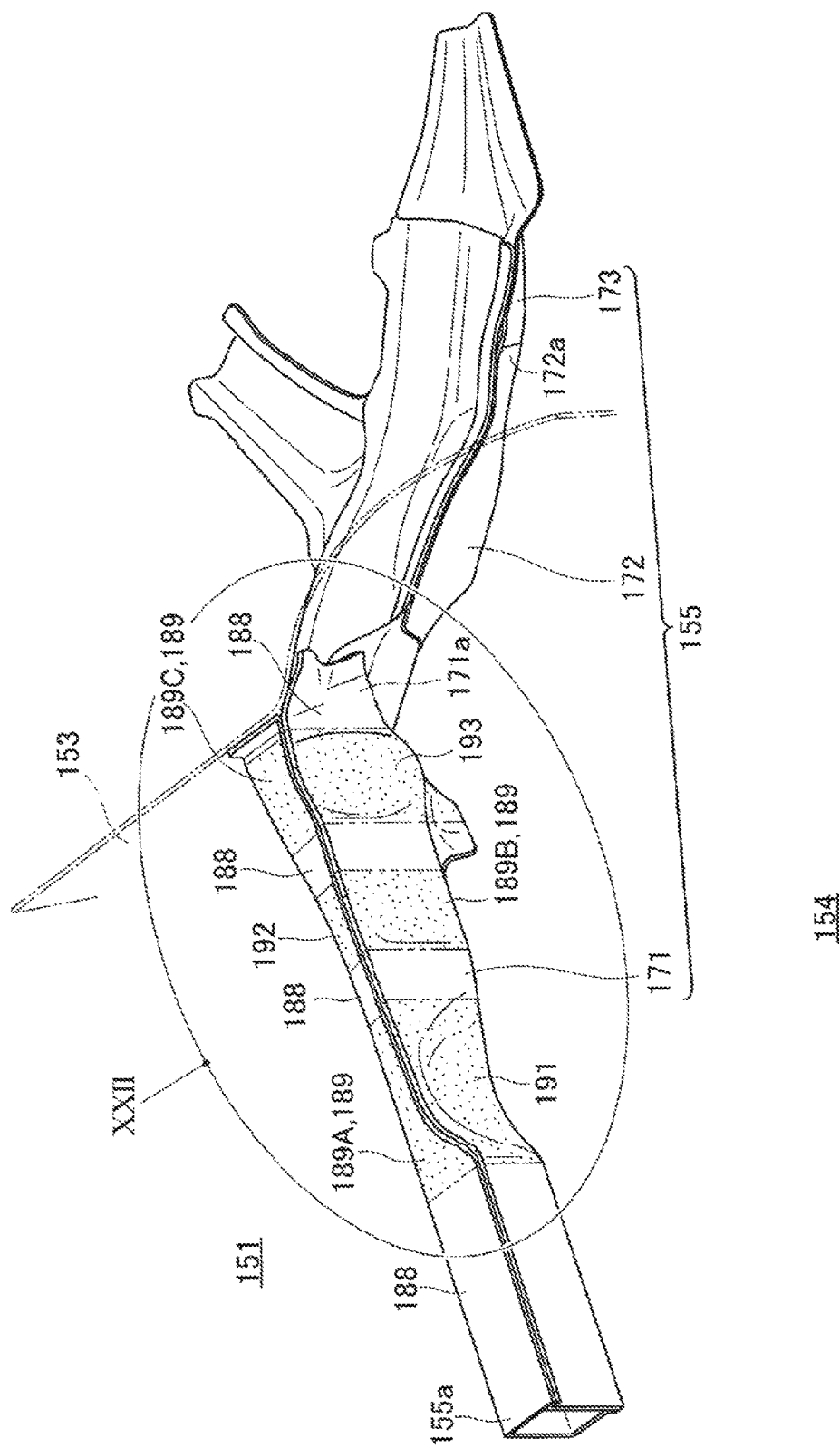
FIG. 17 is a perspective view illustrating the front side frame of FIG. 16.
Figure 20:
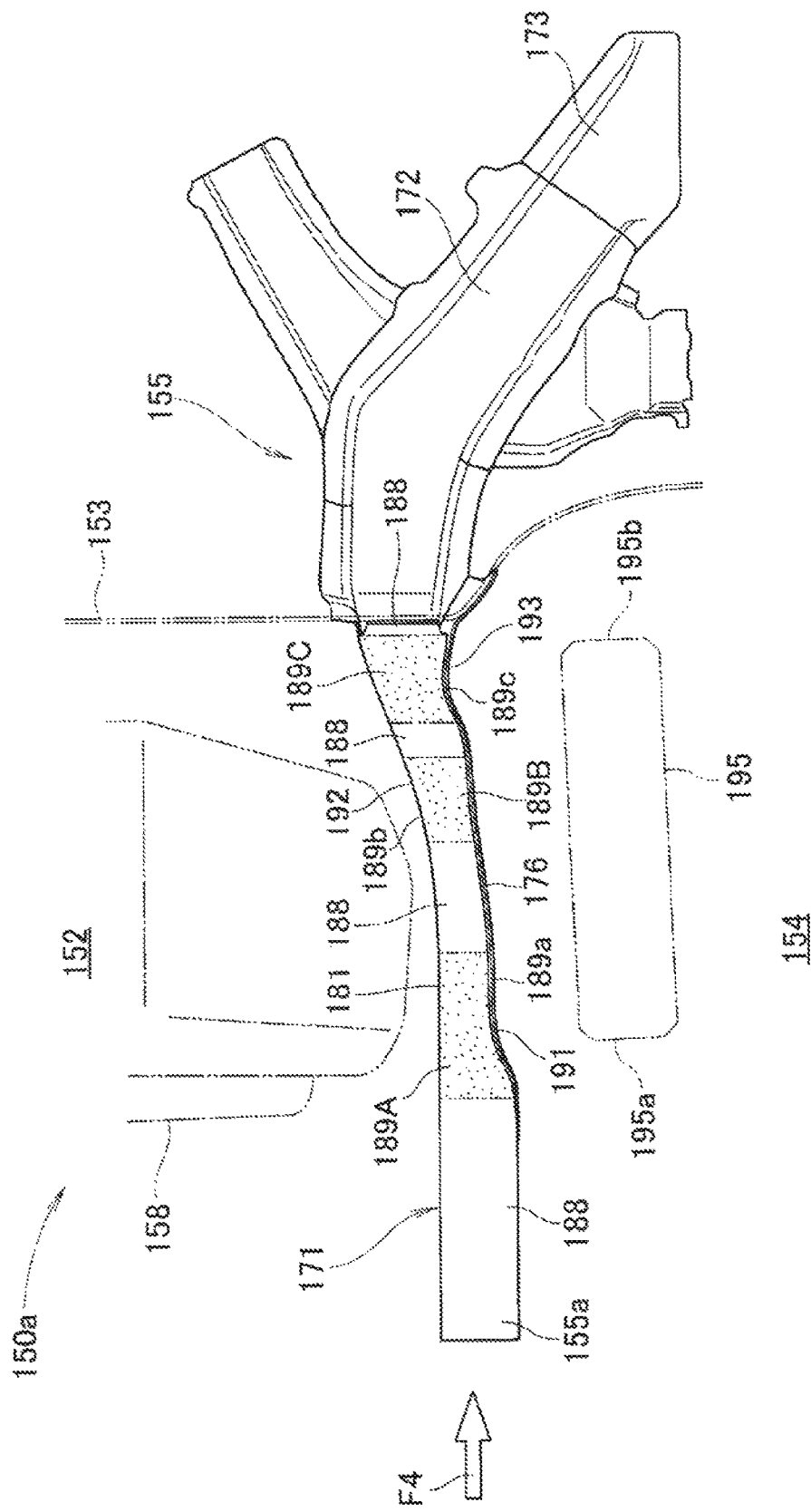
FIG. 20 is a plan view illustrating the front side frame of FIG. 17, as viewed from above.

As illustrated in FIG. 16 and FIG. 17, the front side frame 155 is provided at the left side of a vehicle body front section 150a, at a position inside a front left (front) wheel 195 in the vehicle width direction (see FIG. 20). The front side frame 155 supports a lower left side portion 153c of the lower dashboard 153 and a left side portion 167a of a floor panel 167 (see FIG. 15), and extends toward the vehicle body front as far as a left end 157a of the bumper beam 157.

More specifically, the front side frame 155 includes an impact absorbing section 171 extending from the left end 153a of the lower dashboard 153 toward the vehicle body front, a sloping section 172 extending from a rear end 171a of the impact absorbing section 171 at a downward gradient toward the vehicle body rear, and a horizontal section 173 extending from a rear end 172a of the sloping section 172 toward the vehicle body rear.

The sloping section 172 extends from the rear end 171a of the impact absorbing section 171 at a downward gradient toward the vehicle body rear along the lower left side portion 153c of the lower dashboard 153. The lower left side portion 153c of the lower dashboard 153 is supported by the sloping section 172.

The horizontal section 173 extends from the rear end 172a of the sloping section 172 toward the vehicle body rear along the left side portion 167a of the floor panel 167. The left side portion 167a of the floor panel 167 is supported by the horizontal section 173.

Figure 18:
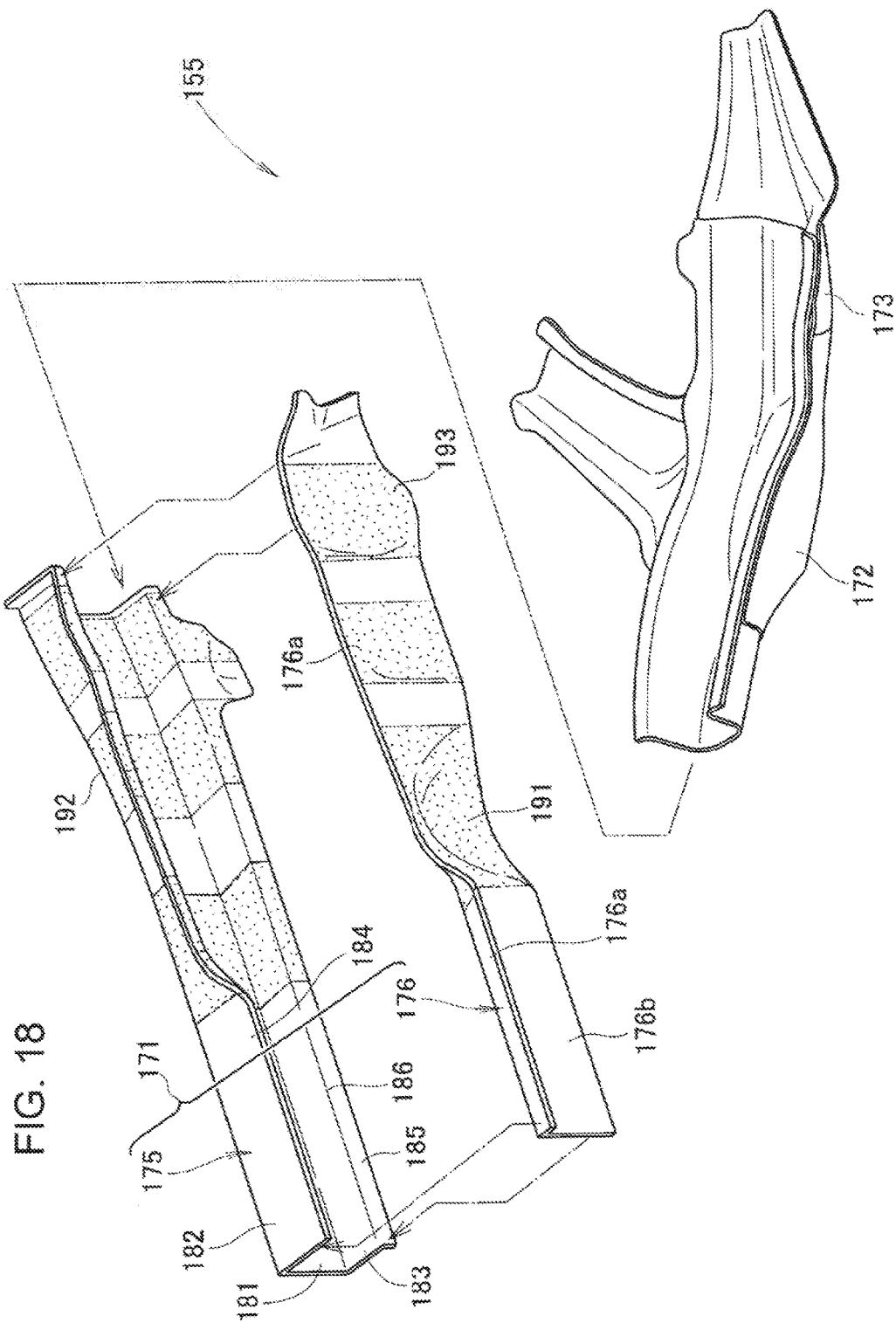
FIG. 18 is an exploded perspective view illustrating the front side frame of FIG. 17.
Figure 19:
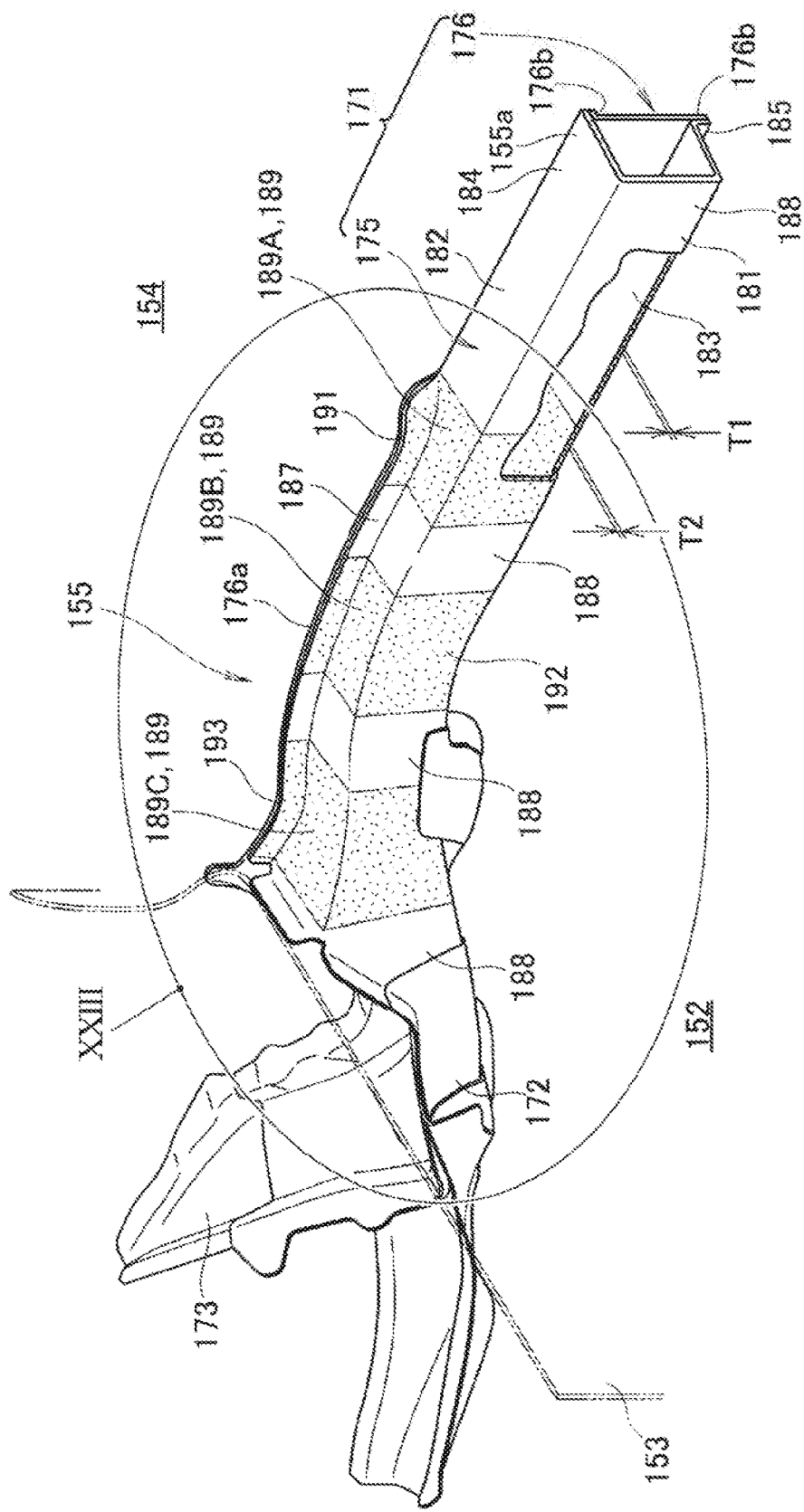
FIG. 19 is a perspective view illustrating the front side frame of FIG. 17, as viewed from an engine room side.

As illustrated in FIG. 18 and FIG. 19, the impact absorbing section 171 includes two members, these being a first frame 175 and a second frame 176 divided along the longitudinal direction (axial direction) of the front side frame 155. The first frame 175 is disposed on the engine room 152 side, and the second frame 176 is disposed on a vehicle exterior 154 side.

The first frame 175, similarly to the first frame 11 of Example 1, includes a side wall 181, a top section 182, a bottom section 183, an upper flange 184, and a lower flange 185. The side wall 181, the top section 182, and the bottom section 183 of the first frame 175 form a substantially U-shaped cross-section.

The first frame 175 (or more precisely a region between the center and a rear end of the first frame 175) is formed into a substantially hat shaped cross-section by the side wall 181, the top section 182, the bottom section 183, the upper flange 184, and the lower flange 185.

An opening 186 of the first frame 175 is covered by the second frame 176.

The first frame 175 and the second frame 176 are, for example, manufactured by a similar manufacturing method to that of Example 1 as illustrated in FIG. 5 to FIG. 7.

In the impact absorbing section 171, the upper flange 184 of the first frame 175, and an upper edge 176a of the second frame 176 are welded together. The lower flange 185 of the first frame 175 and a lower edge 176b of the second frame 176 are also welded together. The impact absorbing section 171 is thereby formed by the first frame 175 and the second frame 176.

The impact absorbing section 171 extends in the vehicle body front-rear direction, and is formed with a rectangular closed cross-section hollow shape by the first frame 175

(more specifically, by the side wall 181, the top section 182, and the bottom section 183) and the second frame 176.

In the following explanation, the side wall 181 of the first frame 175 will also be referred to as the "inside wall 181" of the impact absorbing section 171, and the second frame 176 will also be referred to as the "outside wall 176" of the impact absorbing section 171.

The impact absorbing section 171 also includes plural ultrahigh strength portions 188 of rectangular closed cross-section (namely, of hollow shape) provided at intervals along the vehicle body front-rear direction, and plural high strength portions 189 of rectangular closed cross-section (namely, of hollow shape) provided interposed between the respective ultrahigh strength portions 188. Plural escape portions 191 to 193 are formed to the plural high strength portions 189.

In order to facilitate understanding of the configuration of the impact absorbing section 171, "multiple dots" have, for convenience, been applied in the drawings to the high strength portions 189.

The ultrahigh strength portions 188 are, similarly to the ultrahigh strength portions 46 of Example 1, locations where the tensile strength exceeds 1400 MPa and are formed with a sheet thickness T1. More specifically, the ultrahigh strength portions 188 are set, for example, with a sheet thickness T1 of from 0.9 to 1.2 mm.

The high strength portions 189 are, similarly to the high strength portions 48 of Example 1, locations where the tensile strength is suppressed to from 500 to 1000 MPa, and are preferably set with a tensile strength of 780 MPa.

The high strength portions 189 are formed with a sheet thickness T2 greater than the sheet thickness T1 of the ultrahigh strength portions 188.

More specifically, the high strength portions 189 are set, for example, with a sheet thickness T2 of from 1.4 to 2.0 mm, and preferably set with a sheet thickness T2 of 1.6 mm.

In the following explanation, out of the plural high strength portions 189, the high strength portion on the vehicle body front side will also be referred to as the "front high strength portion 189A", the high strength portion at the vehicle body center portion will also be referred to as the "central high strength portion 1389B", and the high strength portion on the vehicle body rear side will also be referred to as the "rear high strength portion 189C".

The escape portion provided to the front high strength portion 189A will also be referred to as the "front escape portion 191", the escape portion provided to the central high strength portion 189B will also be referred to as the "central escape portion 192", and the escape portion provided to the rear high strength portion 189C will also be referred to as the "rear escape portion 193".

Figure 21:
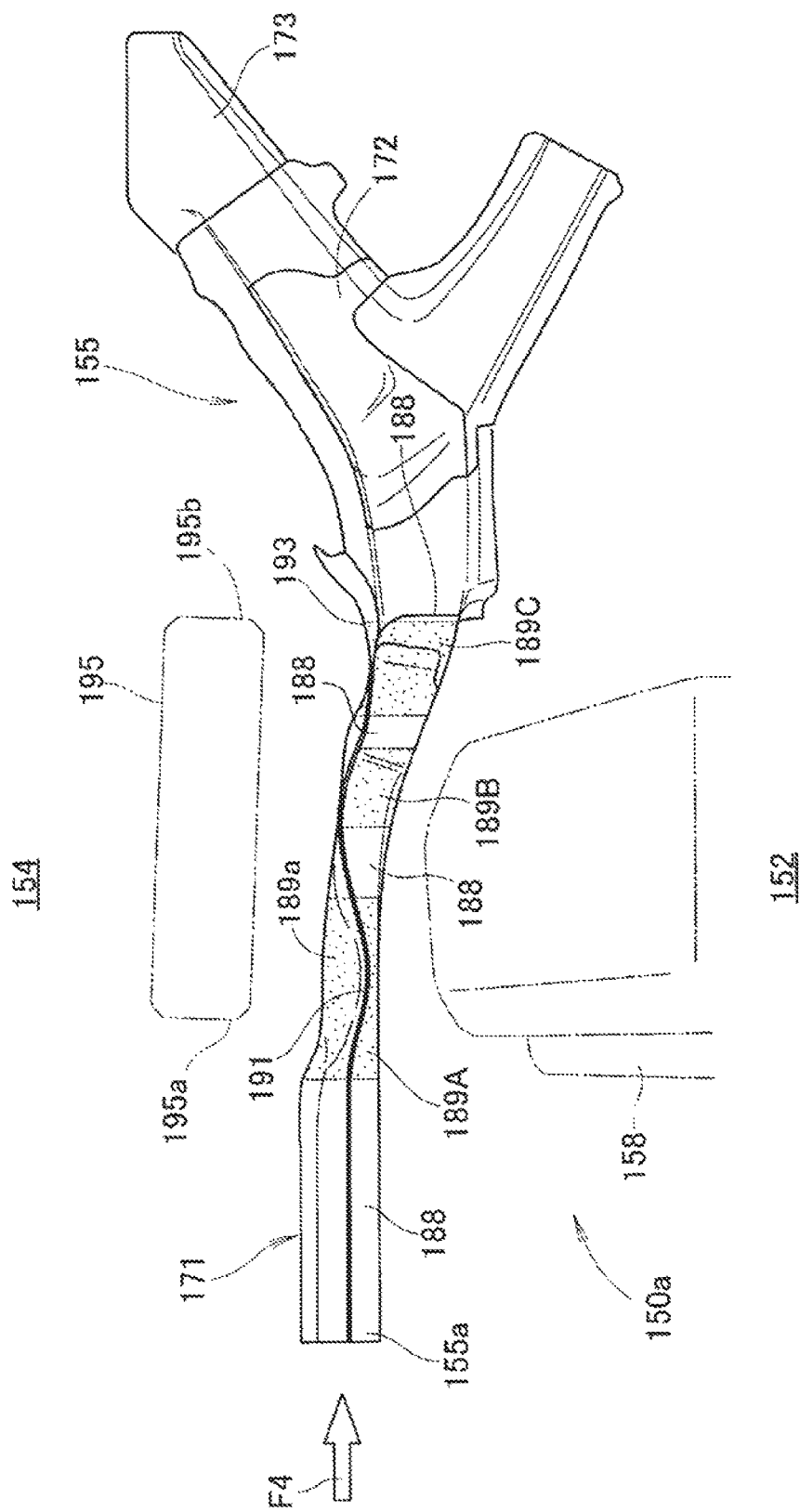
FIG. 21 is a bottom view illustrating the front side frame of FIG. 17, as viewed from below.

As illustrated in FIG. 20 and FIG. 21, the front escape portion 191 is provided at the left side of the vehicle body front section 150a, further to the vehicle width direction inside than a front portion 195a of the front left wheel 195. More specifically, the front escape portion 191 is formed in a concave shape (indented shape) indented toward the vehicle width direction inside on the surface of an outside portion (side portion) 189a of the front high strength portion 189A. The outside portion 189a of the front high strength portion 189A is a side portion on the outside wall 176 side of the impact absorbing section 171.

Forming the front escape portion 191 on the outside wall 176 enables the front portion 195a of the front left wheel 195 to avoid impinging on the outside wall 176 of the impact absorbing section 171 during steering of the front left wheel 195.

The front escape portion 191 is formed in a concave shape in the outside portion 189a of the front high strength portion 189A. This thereby enables stress to be concentrated at the front escape portion 191 under an impact load F4 applied to the front end portion 155a of the front side frame 155. Concentrating stress at the front escape portion 191 enables the front high strength portion 189A to be bent without difficulty. Namely, the front escape portion 191 also doubles as a stress concentrating portion.

The central escape portion 192 is provided at the left side of the vehicle body front section 150a, at the vehicle width direction outside of the power unit 158. More specifically, the central escape portion 192 is formed in a concave shape (indented shape) indented toward the vehicle width direction outside on the surface of an inside portion (side portion) 189b of the central high strength portion 189B. The inside portion 189b of the central high strength portion 189B is a side portion on the inside wall 181 side of the impact absorbing section 171.

Forming the central escape portion 192 in the inside wall 181 enables the power unit 158 to avoid impinging on the inside wall 181 of the impact absorbing section 171.

The central escape portion 192 is formed in a concave shape in the inside portion 189b of the central high strength portion 189B. This thereby enables stress to be concentrated at the central escape portion 192 under the impact load F4 applied to the front end portion 155a of the front side frame 155. Concentrating stress in the central escape portion 192 enables the central high strength portion 189B to be bent without difficulty. Namely, the central escape portion 192 also doubles as a stress concentrating portion.

The rear escape portion 193 is provided at the left side of the vehicle body front section 150a, further to the vehicle width direction inside than a rear portion 195b of the front left wheel 195. More specifically, the rear escape portion 193 is formed in a concave shape (indented shape) indented toward the vehicle width direction inside on the surface of an outside portion (side portion) 189c of the rear high strength portion 189C. The outside portion 189c of the rear high strength portion 189C is a side portion on the outside wall 176 side of the impact absorbing section 171.

Forming the rear escape portion 193 to the outside wall 176 enables the rear portion 195b of the front left wheel 195 to avoid impinging on the outside wall 176 of the impact absorbing section 171 during steering of the front left wheel 195.

The rear escape portion 193 is formed in a concave shape in the outside portion 189c of the rear high strength portion 189C. This thereby enables stress to be concentrated at the rear escape portion 193 under the impact load F4 applied to the front end portion 155a of the front side frame 155. Concentrating stress at the rear escape portion 193 enables the rear high strength portion 189C to be bent without difficulty. Namely, the rear escape portion 193 doubles as a stress concentrating portion.

Utilizing the front escape portion 191, the central escape portion 192, and the rear escape portion 193 as stress concentrating portions in this manner eliminates the need to form any new stress concentrating portions in the impact absorbing section 171.

This thereby enables simplification of the configuration of the impact absorbing section 171 (namely, of the front side frame 155).

The front escape portion 191 and the rear escape portion 193 are formed in the outside wall 176 of the impact absorbing section 171 (namely, of the front side frame 155). This thereby enables the front side frame 155 to be shifted toward the front left wheel 195 side (namely, toward the vehicle width direction outside).

The engine room 152 is formed at the vehicle width direction inside of the front side frame 155. Thus, by shifting the front side frame 155 toward the front left wheel 195 side, the engine room 152 can be expanded in the vehicle width direction, enabling efficient utilization of the engine room 152.

Moreover, the front escape portion 191, the central escape portion 192, and the rear escape portion 193 are respectively formed to the front high strength portion 189A, the central high strength portion 189B, and the rear high strength portion 189C.

This thereby enables the front high strength portion 189A, the central high strength portion 189B, and the rear high strength portion 189C to be favorably bent about the front escape portion 191, the central escape portion 192, and the rear escape portion 193 as the initiation points.

A larger dimension, from 1.4 to 2.0 mm, is also secured as the sheet thickness T2 of the front high strength portion 189A, the central high strength portion 189B, and the rear high strength portion 189C (see FIG. 19).

Thus an amount of stretching can be secured when the front high strength portion 189A, the central high strength portion 189B, and the rear high strength portion 189C are being bent. This thereby enables cracking to be suppressed from developing in the front high strength portion 189A, the central high strength portion 189B, and the rear high strength portion 189C.

Thus, the front escape portion 191, the central escape portion 192, and the rear escape portion 193 are formed in this manner, and a larger dimension is also secured for the sheet thickness T2 of the front high strength portion 189A, the central high strength portion 189B, and the rear high strength portion 189C.

Thus favorable bending can be achieved in the front high strength portion 189A, the central high strength portion 189B, and the rear high strength portion 189C under the impact load F4 applied to the front side frame 155. This thereby enables an appropriate amount of absorption of the impact load F4 to be secured by the impact absorbing section 171.

Moreover, the front escape portion 191, the central escape portion 192, and the rear escape portion 193 are provided at three locations on the impact absorbing section 171, at intervals along the vehicle body front-rear direction. This thereby enables the front escape portion 191, the central escape portion 192, and the rear escape portion 193 to be provided across all areas of the impact absorbing section 171, enabling bending to be achieved across all areas of the impact absorbing section 171 under the impact load F4 applied to the front side frame 155.

Absorption of the impact load F4 can thereby be obtained across all areas of the impact absorbing section 171, enabling an appropriate amount of absorption of the impact load F4 to be secured.

The plural ultrahigh strength portions 188 are formed to locations on the impact absorbing section 171 not required to bend under the impact load F4. This thereby enables the sheet thickness T1 of the plural ultrahigh strength portions 188 to be suppressed to a small dimension of from 0.9 to 1.2 mm (see FIG. 19).

Thus, a weight reduction is achieved in the front side frame 155 in a state in which the rigidity of the front side frame 155 has been secured.

Namely, the front side frame 155 of Example 4 enables both a weight reduction and impact load absorption capability to be achieved.

Figure 22:
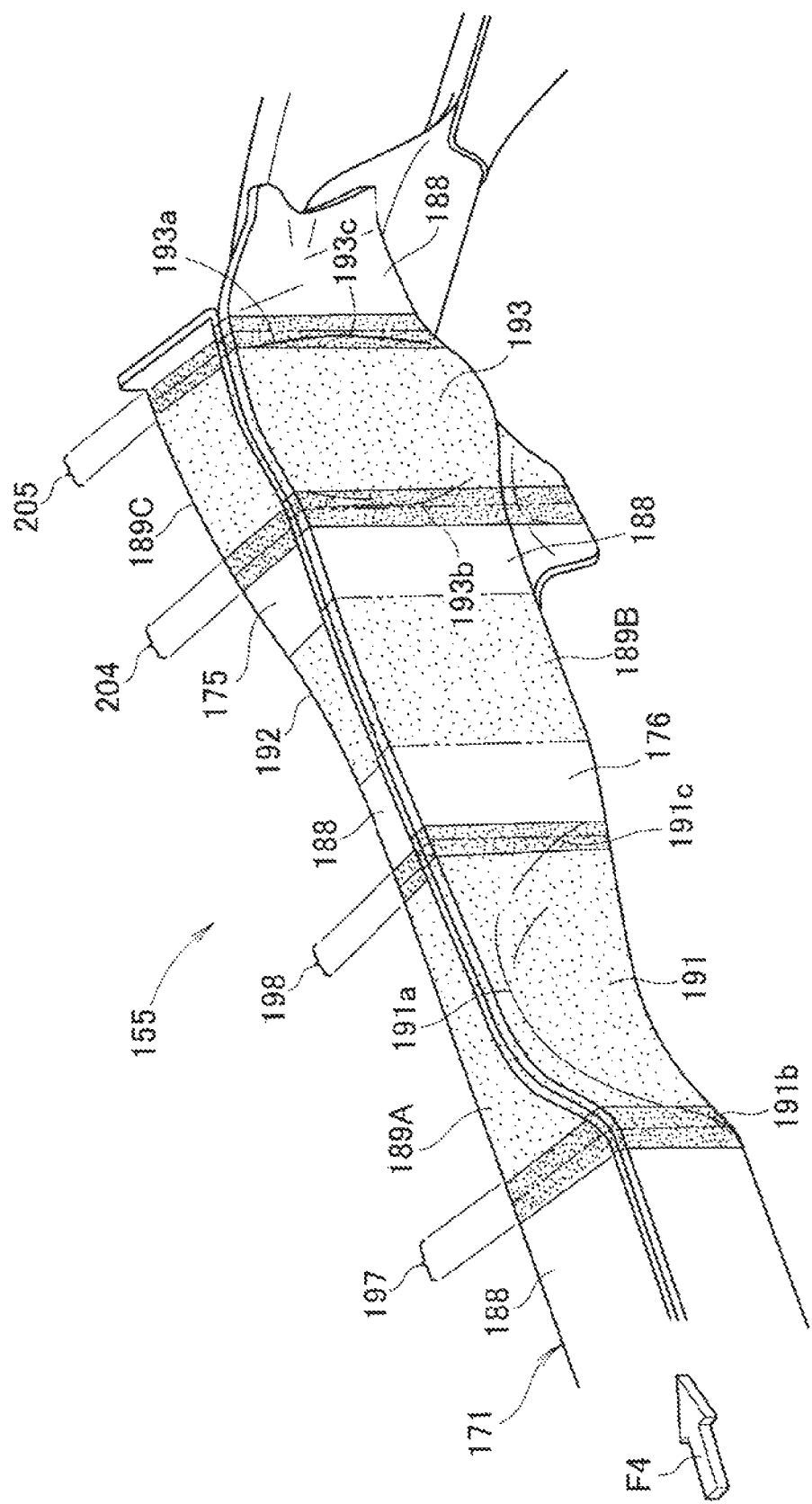
FIG. 22 is an enlargement of area XXII in FIG. 17.

As illustrated in FIG. 22 and FIG. 23, the impact absorbing section 171 includes a front strength transition portion (strength transition portion) 197 and a rear strength transition portion (strength transition portion) 198, at the front end side and the rear end side of the front escape portion 191. The front side frame 155 includes a front strength transition portion (strength transition portion) 201 and a rear strength transition portion (strength transition portion) 202, at the front end side and the rear end side of the central escape portion 192.

Moreover, the impact absorbing section 171 includes a front strength transition portion (strength transition portion) 204 and a rear strength transition portion (strength transition portion) 205, at the front end side and the rear end side of the rear escape portion 193.

For convenience, the front strength transition portions 197, 201, 204 and the rear strength transition portions 198, 202, 205 have been applied in the drawings with denser "multiple dots" than those of the high strength portions 189.

Detailed explanation follows regarding the front strength transition portions 197, 201, 204 and the rear strength transition portions 198, 202, 205.

The front escape portion 191 is formed with an outline 191*a* bending along the outer shape of the front escape portion 191. The outline 191*a* is referred to below as "front outline 191*a*". The front outline 191*a* includes a front line portion 191*b* and a rear line portion 191*c* that are each disposed in the vicinity to a boundary to one of the ultrahigh strength portions 188.

The front line portion 191*b* and the rear line portion 191*c* of the front outline 191*a* each disposed in the vicinity to a boundary to one of the ultrahigh strength portions 188. Thus the tensile strength changes rapidly at the front line portion 191*b* and the rear line portion 191*c* of the front outline 191*a*.

It is accordingly conceivable that a concentration of stress will occur at the front line portion 191*b* and the rear line portion 191*c* of the front outline 191*a*. When stress concentrates at the front line portion 191*b* and the rear line portion 191*c* of the front outline 191*a*, sometimes it would be difficult to cause favorable stress concentration at the front escape portion 191.

The front line portion 191*b* of the front outline 191*a* is accordingly disposed in the vehicle body front-rear direction so as to be contained in the front strength transition portion (strength transition portion) 197. The rear line portion 191*c* of the front outline 191*a* is also disposed in the vehicle body front-rear direction so as to be contained in the rear strength transition portion (strength transition portion) 198.

More specifically, the front strength transition portion 197 and the rear strength transition portion 198 may be formed only at the locations containing the front line portion 191*b* and the rear line portion 191*c* of the front outline 191*a*, or the front strength transition portion 197 and the rear strength transition portion 198 may be formed as hollow rectangular shaped closed cross-sections spanning around the entire periphery of the impact absorbing section 171.

The front strength transition portion 197 and the rear strength transition portion 198 of the front escape portion 191 are set such that there is a gradual transition in tensile strength between the tensile strength of the ultrahigh strength portions 188 (1400 MPa), and the tensile strength of the front high strength portion 189A (from 500 to 1000 MPa).

In other words, the front strength transition portion 197 and the rear strength transition portion 198 of the front escape portion 191 are locations where the tensile strength gradually transitions between the tensile strengths of the ultrahigh strength portions 188 and the front high strength portion 189A.

This thereby enables a rapid change from the tensile strength of the ultrahigh strength portions 188 to the tensile strength of the front high strength portion 189A to be suppressed from occurring at the front line portion 191b and the rear line portion 191c of the front escape portion 191.

By, for example, forming a gap between a mold and each of the frames 175, 176 when the first frame 175 and the second frame 176 of the front side frame 155 are being hot stamped, a gradual change in tensile strength can be achieved in the front strength transition portion 197 and the strength transition portion 198, with the gap as a boundary.

Such hot stamping is generally known technology such as that disclosed, for example, in Japanese Unexamined Patent Application Publication No. 2003-328031, the entire contents of which are incorporated herein by reference.

The central escape portion 192 is, similarly to the front escape portion 191, formed with an outline 192a bending along the outer shape of the central escape portion 192. The outline 192a is referred to as the "center outline 192a". The center outline 192a includes a front line portion 192b and the rear line portion 192c that are each disposed in the vicinity to a boundary to one of the ultrahigh strength portions 188.

The front line portion 192b of the center outline 192a is disposed in the vehicle body front-rear direction so as to be contained in the front strength transition portion (strength transition portion) 201. The rear line portion 192c of the center outline 192a is disposed in the vehicle body front-rear direction so as to be contained in the rear strength transition portion (strength transition portion) 202.

More specifically, the front strength transition portion 201 and the rear strength transition portion 202 may be formed only at the locations containing the front line portion 192b and the rear line portion 192c of the center outline 192a, or the front strength transition portion 201 and the rear strength transition portion 202 may be formed as hollow rectangular shaped closed cross-sections spanning around the entire periphery of the impact absorbing section 171.

The front strength transition portion 201 and the rear strength transition portion 202 of the central escape portion 192 are set such that there is a gradual transition in tensile strength between the tensile strength of the ultrahigh strength portions 188 (1400 MPa), and the tensile strength of the central high strength portion 189B (from 500 to 1000 MPa).

This thereby enables a rapid change from the tensile strength of the ultrahigh strength portions 188 to the tensile strength of the central high strength portion 189B to be suppressed from occurring at the front line portion 192b and the rear line portion 192c of the central escape portion 192.

Moreover, the rear escape portion 193, similarly to the front escape portion 191, is formed with an outline 193a bending along the outer shape of the rear escape portion 193. The outline 193a is referred to below as the "rear outline 193a". The outline 193a includes a front line portion 193b and a rear line portion 193c that are each disposed in the vicinity to a boundary to one of the ultrahigh strength portions 188.

The front line portion 193b of the outline 193a is disposed in the vehicle body front-rear direction so as to be contained in the front strength transition portion (strength transition portion) 204. The rear line portion 193c of the outline 193a is disposed in the vehicle body front-rear direction so as to be contained in the rear strength transition portion (strength transition portion) 205.

More specifically, the front strength transition portion 204 and the rear strength transition portion 205 may be formed only at the locations containing the front line portion 193b and the rear line portion 193c of the outline 193a, or the front strength transition portion 204 and the rear strength transition portion 205 may be formed as hollow rectangular shaped closed cross-sections spanning around the entire periphery of the impact absorbing section 171.

The front strength transition portion 204 and the rear strength transition portion 205 of the rear escape portion 193 are set such that there is a gradual transition in tensile strength between the tensile strength of the ultrahigh strength portions 188 (1400 MPa), and the tensile strength of the rear high strength portion 189C (from 500 to 1000 MPa).

This thereby enables a rapid change from the tensile strength of the ultrahigh strength portions 188 to the tensile strength of the rear high strength portion 189C to be suppressed from occurring at the front line portion 193b and the rear line portion 193c of the rear escape portion 193.

This thereby enable a rapid change in tensile strength to be suppressed from occurring at the front line portion 191b and the rear line portion 191c of the front escape portion 191, at the front line portion 192b and the rear line portion 192c of the central escape portion 192, and at the front line portion 193b and the rear line portion 193c of the rear escape portion 193.

This thereby enables the degree of stress concentration at the front line portion 191b and the rear line portion 191c of the front escape portion 191 to be alleviated when the impact load F4 is applied to the front end portion 155a of the front side frame 155 (see FIG. 19). This thereby enables the degree of stress concentration at the front escape portion 191 to be raised, enabling the front high strength portion 189A to be bent without difficulty.

Moreover, the degree of stress concentration at the front line portion 192b and the rear line portion 192c of the central escape portion 192 can be alleviated. This thereby enables the degree of stress concentration at the central escape portion 192 to be raised, enabling the central high strength portion 189B to be bent without difficulty.

The degree of stress concentration at the front line portion 193b and the rear line portion 193c of the rear escape portion 193 can also be alleviated. This thereby enables the degree of stress concentration at the rear escape portion 193 to be raised, enabling the rear high strength portion 189C to be bent without difficulty.

Bending the front high strength portion 189A, the central high strength portion 189B, and the rear high strength portion 189C without difficulty enables the front side frame 155 to be bent without difficulty. This thereby enables an appropriate amount of absorption of the impact load F4 applied to the front side frame 155 to be secured.

Next, explanation follows regarding an example of an impact load F5 applied to the vehicle body front structure 150 being absorbed by the left front side frame 155 and the right front side frame 156, with reference to FIG. 24A to FIG. 24C and FIG. 25A to FIG. 25C.

Figure 24A:
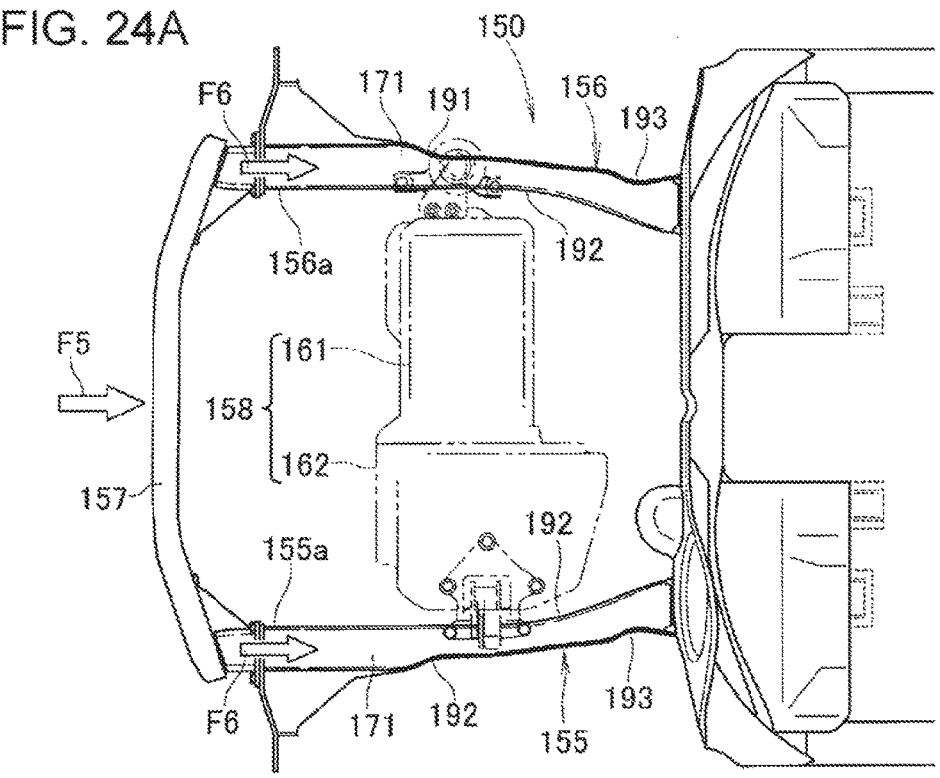
FIG. 24A to FIG. 24C are explanatory diagrams of an example in which an impact load is applied to a front side frame of Example 4.

As illustrated in FIG. 24A, the impact load F5 toward the vehicle body rear is applied to the bumper beam 157 of the vehicle body front structure 150, and part of the impact load F5 is absorbed by deformation of the bumper beam 157. The remainder of the impact load is transmitted to the front end portion 155a of the left front side frame 155, and to the front end portion 156a of the right front side frame 156.

Figure 24B:
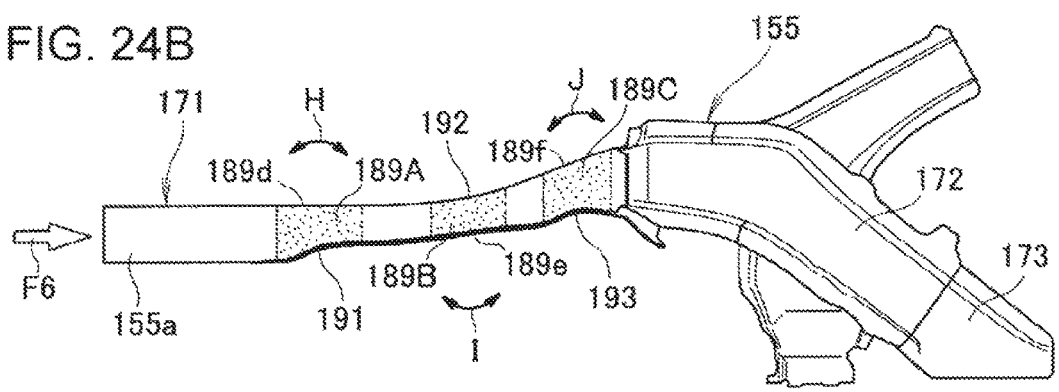
Figure 24C:
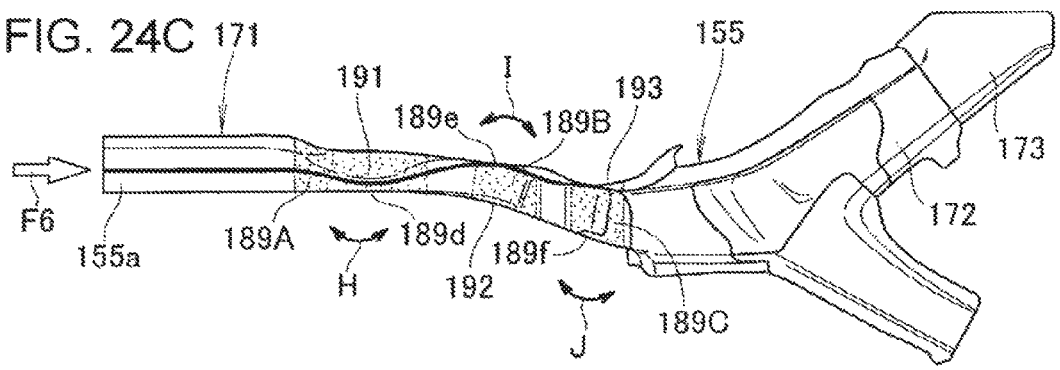

As illustrated in FIG. 24B and FIG. 24C, the impact load transmitted to the front end portion 155a of the left front side frame 155 is applied as an impact load F6 along the longitudinal direction of the front side frame 155.

Stress concentrates at the front escape portion 191, the central escape portion 192, and the rear escape portion 193 due to the impact load F6 being applied to the left front side frame 155.

Thus the front escape portion 191, the central escape portion 192, and the rear escape portion 193 act as the bending initiation points (triggers) for the left front side frame 155.

More specifically, the front high strength portion 189A bends as indicated by the arrow H, with the front escape portion 191 acting as the initiation point. The central high strength portion 189B bends as indicated by the arrow I, with the central escape portion 192 acting as the initiation point. The rear high strength portion 189C bends as indicated by the arrow J, with the rear escape portion 193 acting as the initiation point.

The front high strength portion 189A, the central high strength portion 189B, and the rear high strength portion 189C each have a tensile strength suppressed to from 500 to 1000 MPa, and are each formed with a sheet thickness T2 (see FIG. 19) that is greater than the sheet thickness T1 of the ultrahigh strength portions 188 (see FIG. 19).

This thereby enables an amount of stretch of an inside portion 189d of the front high strength portion 189A to be secured. The inside portion 189d of the front high strength portion 189A is a side portion on the opposite side to the front escape portion 191.

An amount of stretch of an outside portion 189e of the central high strength portion 189B can also be secured. The outside portion 189e of the central high strength portion 189B is a side portion on the opposite side to the central escape portion 192. An amount of stretch of an inside portion 189f of the rear high strength portion 189C can also be secured. The inside portion 189f of the rear high strength portion 189C is a side portion on the opposite side to the rear escape portion 193.

Returning to FIG. 25A, similarly to the left front side frame 155, impact load is transmitted to the front end portion 156a of the right front side frame 156. The impact load transmitted to the front end portion 156a is applied as the impact load F6 along the longitudinal direction of the right front side frame 156.

Stress is concentrated at the front escape portion 191, the central escape portion 192, and the rear escape portion 193 of the right front side frame 156 due to the impact load F6 applied to the right front side frame 156. The front escape portion 191, the central escape portion 192, and the rear escape portion 193 of the right front side frame 156 accordingly act as the bending initiation point (triggers) for the right front side frame 156.

Figure 25A:
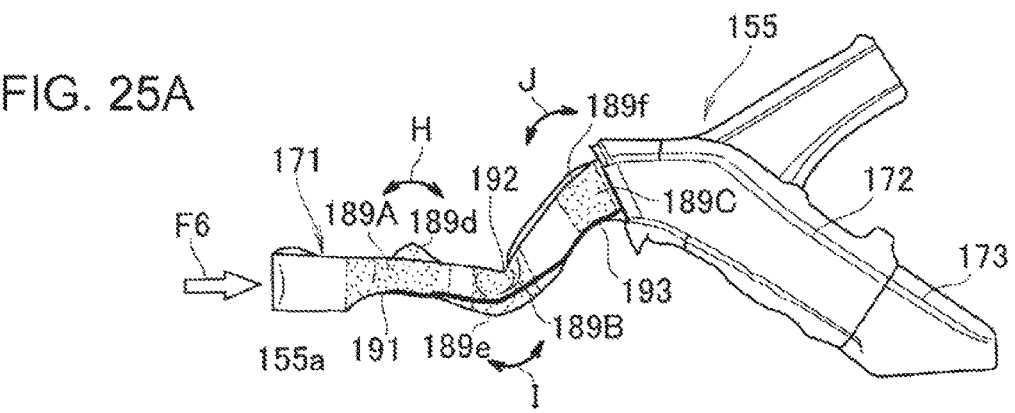
FIG. 25A to FIG. 25C are explanatory diagrams of an example of impact load absorption with a front side frame of Example 4.
Figure 25B:
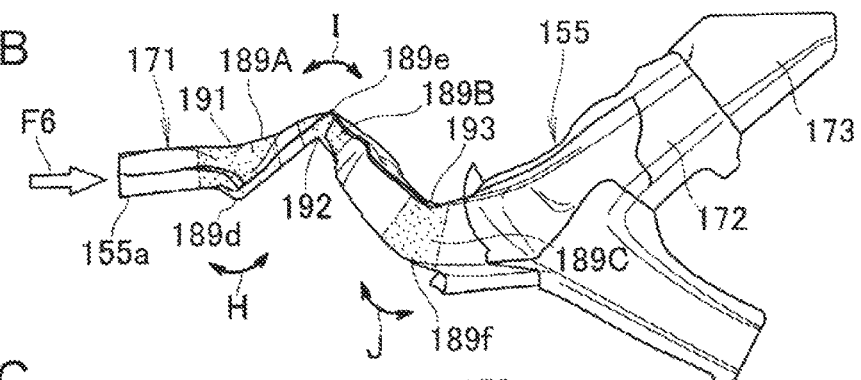

As illustrated in FIG. 25A and FIG. 25B, cracking can be suppressed from developing in the inside portion 189d, the outside portion 189e, and the inside portion 189f of the right front side frame 156 during stretching of the inside portion 189d of the front high strength portion 189A, the outside portion 189e of the central high strength portion 189B, and the inside portion 189f of the rear high strength portion 189C.

This thereby enables the front high strength portion 189A to be favorably bent about the initiation point of the front escape portion 191 as indicated by arrow H. The central high strength portion 189B can also be favorably bent about the initiation point of the central escape portion 192 as indicated by arrow I.

The rear high strength portion 189C can also be favorably bent about the initiation point of the rear escape portion 193 as indicated by arrow J.

In this manner, favorable bending can be achieved in all areas of the right front side frame 156 due to the favorable bending of the front high strength portion 189A, the central high strength portion 189B, and the rear high strength portion 189C.

Figure 25C:
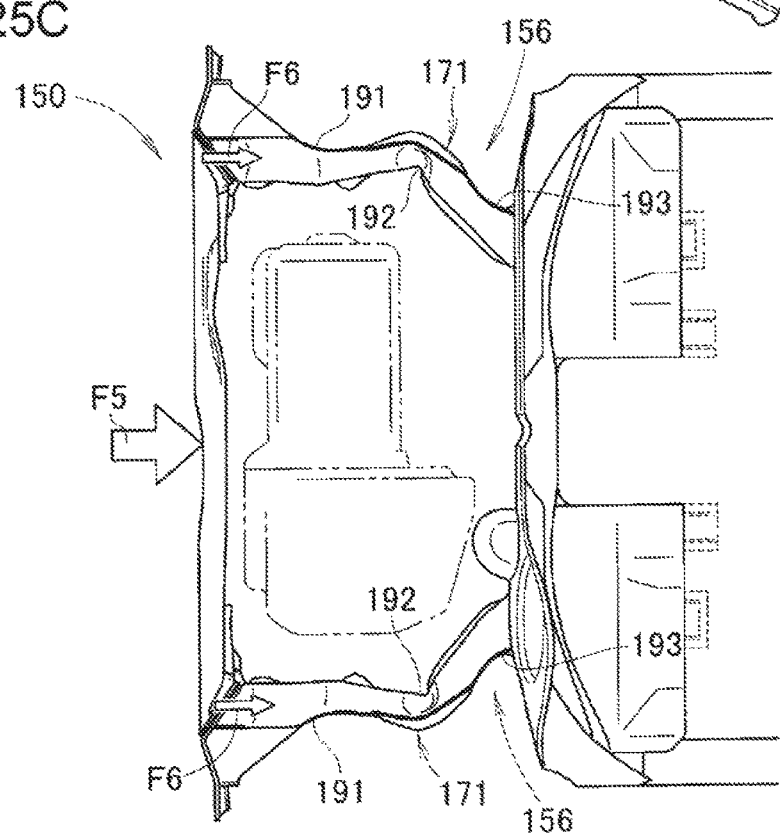

Thus as illustrated in FIG. 25C, similarly to in the left front side frame 155, favorable bending can be achieved all areas of the right front side frame 156 about initiation points of the front escape portion 191, the central escape portion 192, and the rear escape portion 193.

Due to achieving favorable bending in this manner over all areas of the left front side frame 155 and all areas of the right front side frame 156, the impact load F6 can be sufficiently absorbed by the left front side frame 155 and the right front side frame 156.

This thereby enables an appropriate amount of absorption of the impact load F6 applied to the left front side frame 155 and to the right front side frame 156 to be secured.

The vehicle body side frame according to the present application is not limited to the above Examples, and may be appropriately modified or improved.

For example, although explanation has been given in Example 1 and Example 2 of examples in which the side frame 10, 80 is divided into two members, these being the first frame 11, 81 and the second frame 12, 82, there is no limitation thereto, and the side frame 10, 80 may be divided into another number of plural members, such as three members.

Moreover, although explanation has been given in Examples 1 to 3 of examples in which the stress concentrating portions 51 to 53 and 125 to 127 are formed with a concave shape, there is no limitation thereto, and another shape may be employed for the stress concentrating portions, such as an opening.

Moreover, although explanation has been given of examples in which the stress concentrating portions 51 to 53 and 125 to 127 are provided at three locations at intervals along the vehicle body front-rear direction, there is no limitation thereto, and the number of stress concentrating portions may be appropriately selected.

Moreover, although explanation has been given in Example 4 of an example in which the escape portions 191 to 193 are formed as concave shapes, there is no limitation thereto, and another shape may be employed for the escape portions, such as an opening.

Moreover, although explanation has been given of an example in which the escape portions 191 to 193 are formed in three locations at intervals in the vehicle body front-rear direction, there is no limitation thereto, and the number of escape portions may be appropriately selected.

Moreover, although explanation has been given in Example 4 of an example in which the strength transition portions 197, 198, 201, 202, 204, 205 are provided to the impact absorbing section 171, there is no limitation thereto, and strength transition portions may also be provided to the impact absorbing section 42, 117 in Examples 1 to 3, in a manner similar to in Example 4. This thereby enables the impact absorbing section 42, 117 of Examples 1 to 3 to be bent without difficulty, similarly to the impact absorbing section 171 of Example 4.

Moreover, although explanation has been given in Example 4 of an example in which the vehicle body side frame is applied to the left front side frame 155 and the right front side frame 156, there is no limitation thereto.

The vehicle body side frame is applicable to other frames, such as to a rear side frame provided in a vehicle body rear section.

Moreover, although explanation has been given in Example 1 to Example 4 of examples in which the impact absorbing section 42, 117, 171 is formed with a hollow rectangular shaped closed cross-section, there is no limitation thereto, and the impact absorbing section 42, 117, 171 may be formed in another shape, such as a hollow circular shaped closed cross-section.

Moreover, although explanation has been given in Example 4 of an example in which the front escape portion 191 and the rear escape portion 193 for preventing impinging of the front left wheel 195, and the central escape portion 192 for preventing impinging of the power unit 158, double as three locations of stress concentrating portions, there is no limitation thereto.

For example, the two locations of the front escape portion 191 and the rear escape portion 193 for preventing impinging of the front left wheel 195 may double as stress concentrating portions.

Moreover, there is no limitation to the shape and configuration of the side frames, the front side frames, the first frame, the second frame, the ultrahigh strength portions, the high strength portions, the stress concentrating portions, the vehicle body front structure, the escape portions, the outlines, the front left wheel, and the strength transition portions, etc. illustrated in Example 1 to Example 4, and appropriate modifications may be made thereto.

The technology disclosed herein is suitably employed in a vehicle provided with vehicle body side frames extending along the front-rear direction of the vehicle body, and capable of absorbing impact load applied along the vehicle body front-rear direction. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body side frame that is formed in a hollow shape extending along a vehicle body front-rear direction and that absorbs applied impact load by bending under the applied impact load, the vehicle body side frame comprising:
a plurality of ultrahigh strength portions provided at intervals along a longitudinal direction of the vehicle body side frame, each of the plurality of ultrahigh strength portions having a hollow shape and having a tensile strength exceeding 1400 MPa; and
a high strength portion interposed between adjacent ultrahigh strength portions so as to connect the adjacent ultrahigh strength portions to each other, the high strength portion having a hollow shape and having a tensile strength from 500 to 1000 MPa,
wherein the high strength portion has a sheet thickness greater than that of the ultrahigh strength portions, and includes a stress concentrating portion on a side portion thereof, the stress concentrating portion configured to serve as a trigger of bending of the vehicle body side frame to stretch an opposite side portion of the high strength portion disposed opposite to the side portion due to the bending.

2. The vehicle body side frame according to claim 1, wherein:
the vehicle body side frame comprises at least two members including a first frame and a second frame divided along the longitudinal direction of the vehicle body side frame;
the first frame has a hat shaped cross-section and the second frame has a plate shape; and
the first frame and the second frame are formed by employing a tailored rolled blank with a sheet thickness varied by rolling.

3. The vehicle body side frame according to claim 1, wherein the stress concentrating portion is recessed inward of the high strength portion.

4. A vehicle body side frame that is formed in a hollow shape extending along a vehicle body front-rear direction and that absorbs applied impact load by bending under the applied impact load, the vehicle body side frame comprising:
a plurality of ultrahigh strength portions provided at intervals along a longitudinal direction of the vehicle body side frame, each of the plurality of ultrahigh strength portions having a hollow shape and having a first tensile strength; and
a high strength portion interposed between adjacent ultrahigh strength portions so as to connect the adjacent ultrahigh strength portions to each other, the high strength portion having a hollow shape and having a second tensile strength, wherein the second tensile strength is smaller than the first tensile strength,
wherein the high strength portion has a sheet thickness greater than that of the ultrahigh strength portions, and includes a stress concentrating portion on a side surface thereof, the stress concentrating portion is recessed inward of the high strength portion.

5. A vehicle body side frame that is formed in a hollow shape extending along a vehicle body front-rear direction and that absorbs applied impact load by bending under the applied impact load, the vehicle body side frame comprising:
a plurality of ultrahigh strength portions provided at intervals along a longitudinal direction of the vehicle body side frame, each of the plurality of ultrahigh strength portions having a hollow shape and having a tensile strength exceeding 1400 MPa; and
a high strength portion interposed between adjacent ultrahigh strength portions so as to connect the adjacent ultrahigh strength portions to each other, the high strength portion having a hollow shape and having a tensile strength from 500 to 1000 MPa, wherein the high strength portion includes a front high strength portion, a central high strength portion, and a rear high strength portion along the longitudinal direction of the vehicle body side frame,
wherein the high strength portion has a sheet thickness greater than that of the ultrahigh strength portions, and includes a stress concentrating portion on a side portion thereof in a direction the vehicle body side frame will bend, and
wherein the front high strength portion includes the stress concentrating portion on one side thereof, the central high strength portion includes the stress concentrating portion on an opposite side thereof opposite to the one side, and the rear high strength portion includes the stress concentrating portion on the one side thereof.

\* \* \* \* \*